US012627208B2

(12) United States Patent
Endo

(10) Patent No.: US 12,627,208 B2
(45) Date of Patent: May 12, 2026

(54) VIBRATION GENERATING DEVICE WITH FIXED CASE WITH FIRST OUTER AND INNER CYLINDERS AND SECOND CYLINDER ATTACHED TO END OF FIRST OUTER CYLINDER

(71) Applicant: ALPS ALPINE CO., LTD., Tokyo (JP)

(72) Inventor: Tomoya Endo, Miyagi (JP)

(73) Assignee: ALPS ALPINE CO. LTD., Tokyo (JP)

( * ) Notice: Subject to any disclaimer, the term of this patent is extended or adjusted under 35 U.S.C. 154(b) by 270 days.

(21) Appl. No.: 18/392,083

(22) Filed: Dec. 21, 2023

(65) Prior Publication Data

US 2024/0275250 A1 Aug. 15, 2024

(30) Foreign Application Priority Data

Feb. 9, 2023 (JP) ................................. 2023-018656

(51) Int. Cl.
*H02K 33/10* (2006.01)

(52) U.S. Cl.
CPC .................................... *H02K 33/10* (2013.01)

(58) Field of Classification Search
CPC ............ H02K 35/00; H02K 35/02; H02J 1/00
USPC ...................................................... 310/15–28
See application file for complete search history.

(56) References Cited

U.S. PATENT DOCUMENTS

| | | | |
|---|---|---|---|
| 11,418,099 B2 * | 8/2022 | Takahashi | B06B 1/045 |
| 11,632,030 B2 * | 4/2023 | Wasenczuk | H02K 35/02 |
| | | | 310/12.12 |
| 11,658,555 B2 * | 5/2023 | Mori | H02K 33/16 |
| | | | 310/28 |
| 11,831,214 B2 * | 11/2023 | Chiba | B06B 1/14 |
| 11,843,298 B2 * | 12/2023 | Ando | H02K 33/18 |
| 12,334,792 B2 * | 6/2025 | Ogihara | H02K 33/12 |
| 2019/0296627 A1 * | 9/2019 | Takahashi | H02K 35/02 |
| 2020/0389078 A1 | 12/2020 | Takahashi et al. | |
| 2021/0328491 A1 | 10/2021 | Takahashi et al. | |
| 2022/0123639 A1 * | 4/2022 | Takahashi | H02K 33/06 |
| 2024/0079942 A1 * | 3/2024 | Shimomura | H02K 33/18 |

FOREIGN PATENT DOCUMENTS

| | | |
|---|---|---|
| JP | 2020-199495 | 12/2020 |
| WO | 2020/045470 | 3/2020 |

* cited by examiner

*Primary Examiner* — Maged M Almawri

(74) *Attorney, Agent, or Firm* — IPUSA, PLLC

(57) ABSTRACT

A vibration generating device including a fixed case including a tube extending in a first direction; a coil attached inside the tube; a movable body arranged inside the coil and including a magnetic field generator configured to generate a magnetic field toward the coil; and a support member interposed between the fixed case and the movable body and supporting the movable body inside the coil such that the movable body is configured to vibrate in the first direction. The fixed case includes a first fixed case member including a first outer cylinder and an inner cylinder extending from the first outer cylinder along the first direction, and a second fixed case member including a second outer cylinder attached to an end of the first outer cylinder to cover the inner cylinder. The coil is wound around the inner cylinder and covered by the second outer cylinder.

6 Claims, 13 Drawing Sheets

VIBRATION GENERATING DEVICE WITH FIXED CASE WITH FIRST OUTER AND INNER CYLINDERS AND SECOND CYLINDER ATTACHED TO END OF FIRST OUTER CYLINDER

CROSS-REFERENCE TO RELATED APPLICATION

This patent application is based on and claims priority to Japanese Patent Application No. 2023-018656 filed on Feb. 9, 2023, the entire contents of which are incorporated herein by reference.

BACKGROUND

1. Field of the Invention

The present disclosure relates to a vibration generating device.

2. Description of the Related Art

A vibration actuator including a case that accommodates a coil bobbin around which a coil can be directly wound is known (see Patent Document 1). Additionally, a vibration actuator in which a coil bobbin around which a coil can be directly wound is formed in a part of a case is known (see Patent Document 2).

RELATED-ART DOCUMENTS

Patent Document

Patent Document 1: Japanese Laid-Open Patent Application Publication No. 2020-199495
Patent Document 2: International Publication Pamphlet No. WO 2020-045470

SUMMARY

According to one aspect of an embodiment, a vibration generating device including a fixed case including a tube extending in a first direction; a coil attached inside the tube; a movable body arranged inside the coil, the movable body including a magnetic field generator configured to generate a magnetic field toward the coil; and a support member interposed between the fixed case and the movable body and supporting the movable body inside the coil such that the movable body is configured to vibrate in the first direction. The fixed case includes a first fixed case member including a first outer cylinder and an inner cylinder having a diameter less than a diameter of the first outer cylinder and extending from the first outer cylinder along the first direction, and a second fixed case member including a second outer cylinder attached to an end of the first outer cylinder to cover the inner cylinder. The coil is wound around the inner cylinder and covered by the second outer cylinder.

DETAILED DESCRIPTION

In the configuration disclosed in Patent Document 1, a case and a coil bobbin are formed as separate members, and therefore, a problem such as power loss or noise due to a rattling movement between the case and the coil bobbin may occur.

In the configuration disclosed in Patent Document 2, it is necessary to attach a cover to the outer side of the coil in order to prevent the coil wound around the coil bobbin, which is a part of the case, from being exposed to the outside, and the number of components may increase.

Thus, it is desired to provide a vibration generating device that can suppress the occurrence of the problem caused by the rattling movement between the case and the coil bobbin and can suppress an increase in the number of components.

The vibration generator described above can suppress the occurrence of a problem such as power loss or noise, and suppress an increase in the number of components.

Figure 1:
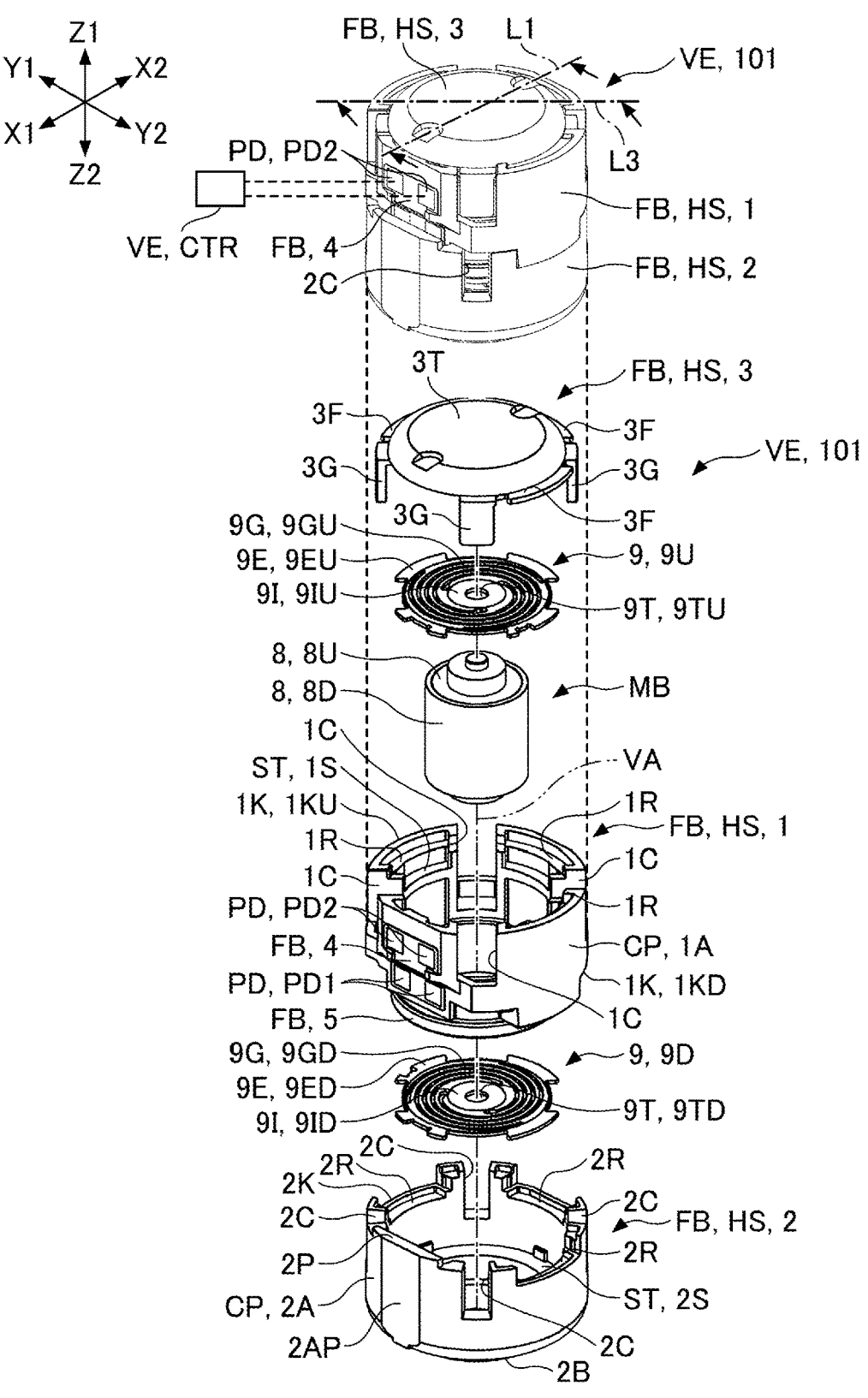
FIG. 1 is a view illustrating an example of a configuration of a vibration generating device.

In the following, a vibration generating device 101 according to an embodiment of the present disclosure will be described with reference to the drawings. FIG. 1 is a view illustrating a configuration example of the vibration generating device 101. Specifically, an upper drawing of FIG. 1 is a perspective view of the vibration generating device 101, and a lower drawing of FIG. 1 is an exploded perspective view of the vibration generating device 101.

In FIG. 1, X1 represents one direction of the X-axis of the three-dimensional orthogonal coordinate system, and X2 represents the other direction of the X-axis. Additionally, Y1 represents one direction of the Y-axis of the three-dimensional orthogonal coordinate system, and Y2 represents the other direction of the Y-axis. Similarly, Z1 represents one direction of the Z-axis of the three-dimensional orthogonal coordinate system, and Z2 represents the other direction of the Z-axis. In the present embodiment, the X1 side of the vibration generating device 101 corresponds to the front side (the front surface side) of the vibration generating device 101, and the X2 side of the vibration generating device 101 corresponds to the back side (the back surface side) of the vibration generating device 101. Additionally, the Y1 side of the vibration generating device 101 corresponds to the left side of the vibration generating device 101, and the Y2 side of the vibration generating device 101 corresponds to the right side of the vibration generating device 101. The Z1 side of the vibration generating device 101 corresponds to the upper side of the vibration generating device 101, and the Z2 side of the vibration generating device 101 corresponds to the lower side of the vibration generating device 101. The same applies to the other drawings.

A vibrating device VE includes a controller CTR and the vibration generating device 101. The vibration generating device 101 is attached to, for example, the inside of a game controller or the like, and is configured to impart vibration to the game controller. Specifically, the vibration generating device 101 includes a fixed body FB including a fixed case HS as a cylindrical case, a movable body MB accommodated in the fixed case HS, and a support member 9 that is disposed between the movable body MB and the fixed body FB and that elastically supports the movable body MB. The fixed body FB includes the fixed case HS, a wiring substrate 4 attached to the fixed case HS, and a coil 5 wound around the fixed case HS. The movable body MB is supported by the support member 9 such that the movable body MB can vibrate along a vibration axis VA.

The controller CTR is connected to a conductive pattern PD (a second conductive pattern PD2) provided on the wiring substrate 4 fixed to the fixed case HS by a double-sided tape. In the present embodiment, the wiring substrate 4 is a flexible printed wiring substrate. The adhesive is a thermosetting adhesive. The same applies to the adhesive in the following description. However, the wiring substrate 4 may be a rigid flexible substrate or the like. Here, the broken line connecting the controller CTR and the conductive pattern PD (the second conductive pattern PD2) provided on the wiring substrate 4 in the upper drawing of FIG. 1 schematically indicates that the controller CTR and the conductive pattern PD (the second conductive pattern PD2) are electrically coupled.

As illustrated in the upper drawing of FIG. 1, the fixed case HS is a case having a substantially cylindrical outer shape with a cover and a bottom. Here, the fixed case HS may have another outer shape such as a substantially rectangular tubular outer shape.

Figure 2:
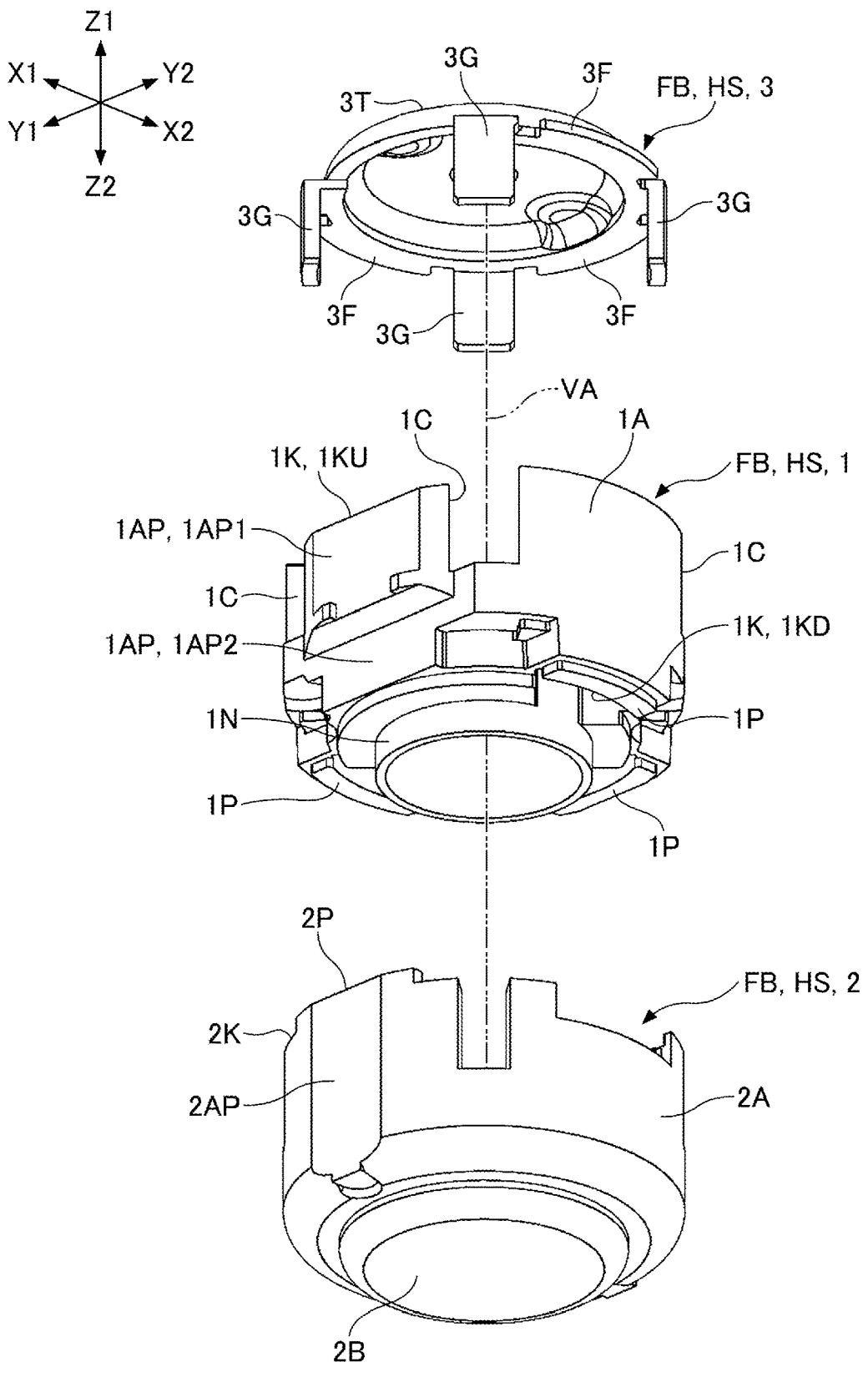
FIG. 2 is an exploded perspective view of a fixed case constituting the vibration generating device.

Here, the fixed case HS will be described in detail with reference to FIG. 1 and FIG. 2. FIG. 2 is an exploded perspective view of the fixed case HS. In the present embodiment, three members that can be separated from each other (a first fixed case member 1, a second fixed case member 2, and a third fixed case member 3) constitute the fixed case HS. In the illustrated example, the first fixed case member 1, the second fixed case member 2, and the third fixed case member 3 are formed containing polybutylene terephthalate (PBT) resin. Here, the first fixed case member 1, the second fixed case member 2, and the third fixed case member 3 may be formed containing another material.

The first fixed case member 1 is formed to constitute an upper portion (substantially the upper half) of the fixed case HS. In the illustrated example, the first fixed case member 1 is configured to include a first outer cylinder 1A and is configured to have opening edges 1K at both ends of the first outer cylinder 1A. Additionally, as illustrated in FIG. 2, the first outer cylinder 1A is formed such that a front surface (a surface on the X1 side) thereof is a flat surface 1AP and remaining surfaces including a left surface, a back surface, and a right surface are partial cylindrical surfaces. Additionally, the flat surface 1AP is configured to form a step in the vertical direction, and has a distal surface 1AP1 and a proximal surface 1AP2. Here, the distal surface 1AP1 indicates a surface located far from the vibration axis VA, and the proximal surface 1AP2 indicates a surface located near the vibration axis VA.

Specifically, the first fixed case member 1 is configured to have an upper opening edge 1KU at the upper end of the first outer cylinder 1A and a lower opening edge 1KD at the lower end of the first outer cylinder 1A. Then, at the substantially annular upper opening edge 1KU, as illustrated in FIG. 1, four cutouts 1C are formed at intervals of 90° and three recesses 1R are formed at intervals of 90°. Additionally, as illustrated in FIG. 2, three protrusions 1P are formed at the substantially annular lower opening edge 1KD at intervals of 90°. Here, the recess 1R is not formed in a portion corresponding to the flat surface 1AP in the upper opening edge 1KU, and the protrusion 1P is not formed in a portion of the lower opening edge 1KD that corresponds to the flat surface 1AP. Additionally, as illustrated in FIG. 2, the first fixed case member 1 includes an inner cylinder 1N that is located inside the first outer cylinder 1A and that extends along the vertical direction. The inner cylinder 1N functions as a coil bobbin around which the coil 5 is wound.

The second fixed case member 2 is formed to constitute a lower portion (substantially the lower half) of the fixed case HS. In the illustrated example, the second fixed case member 2 is formed to include a second outer cylinder 2A and a bottom 2B, and to have an opening edge 2K at the upper end of the second outer cylinder 2A. Additionally, as illustrated in FIG. 2, the second outer cylinder 2A is formed such that a front surface thereof (a surface on the X1 side) is a flat surface 2AP and remaining surfaces including a left surface, a back surface, a right surface are partial cylindrical surfaces. Additionally, the flat surface 2AP protrudes upward to form a protrusion 2P. Then, as illustrated in FIG. 1, four cutouts 2C are formed at intervals of 90° and three recesses 2R are formed at intervals of 90° in the substantially annular opening edge 2K. As illustrated in the upper drawing of FIG. 1, the four cutouts 2C are configured to form openings when the fixed case HS is assembled. This is because, in the process of heating the entire vibration generating device 101 after assembly, heat can be efficiently supplied to the thermosetting adhesive applied to the members inside the fixed case HS, that is, the thermosetting adhesive can be efficiently cured. Here, the recess 2R is not formed in a portion of the opening edge 2K that corresponds to the flat surface 2AP. The three recesses 2R are configured to correspond to the three protrusions 1P formed at the lower opening edge 1KD of the first fixed case member 1. That is, the three protrusions 1P are configured to be fit into the three recesses 2R when the first fixed case member 1 and the second fixed case member 2 are combined, and are fixed by an adhesive.

The third fixed case member 3 is formed to constitute a cover of the fixed case HS. In the illustrated example, the third fixed case member 3 includes a top plate 3T, three flanges 3F protruding outward from an outer edge of the top plate 3T, and four protrusions 3G extending downward from the outer edge of the top plate 3T. The three flanges 3F are configured to correspond to the three recesses 1R formed at the upper opening edge 1KU of the first fixed case member 1. That is, the three flanges 3F are configured to be fit into the three recesses 1R when the first fixed case member 1 and the third fixed case member 3 are combined. Additionally, the four protrusions 3G are configured to correspond to the four cutouts 1C formed at the upper opening edge 1KU of the first fixed case member 1. That is, the four protrusions 3G are configured to mesh with the four cutouts 1C when the first fixed case member 1 and the third fixed case member 3 are combined.

The coil 5 is fixed to the fixed case HS so as to surround the movable body MB. In the present embodiment, the coil

5 is a cylindrical wound coil formed by winding a conductive wire whose surface is coated with an insulating material, and is fixed to the first fixed case member 1 by an adhesive. Here, in FIG. 1, for the sake of clarity, the detailed winding state of the conductive wire is not illustrated. The same applies to the other drawings illustrating the coil 5. In the illustrated example, the coil 5 is wound around the inner cylinder 1N of the first fixed case member 1 and fixed to the inner cylinder 1N by an adhesive. Then, the coil 5 is disposed such that both ends of the wire forming the coil 5 are connected to a conductive pattern PD (a first conductive pattern PD1) formed on the wiring substrate 4. The outer circumferential surface of the inner cylinder 1N of the first fixed case member 1 is exposed as illustrated in FIG. 2 so that the wire can be directly wound around the inner cylinder 1N. Therefore, the coil 5 can be directly wound around the inner cylinder 1N. A process of separately preparing a hollow coil and then incorporating the hollow coil to the inner cylinder 1N is not necessary.

The controller CTR is configured to control the movement of the movable body MB. In the present embodiment, the controller CTR is a device including an electronic circuit, a nonvolatile storage device, and the like, and is configured to control at least a direction of a current flowing through the coil 5. The controller CTR may be configured to control a direction and magnitude of a current flowing through the coil 5 in response to a control command from an external device such as a computer, or may be configured to control a direction and magnitude of a current flowing through the coil 5 without receiving the control command from the external device. In the illustrated example, the controller CTR is configured to supply an alternating current to the coil 5. Here, in the present embodiment, the controller CTR is installed outside the fixed case HS, but may be installed inside the fixed case HS.

The movable body MB is configured to vibrate the fixed case HS. In the present embodiment, the movable body MB is configured to vibrate the fixed case HS by reciprocating in a state of being attached to the inside of the fixed case HS via the support member 9.

Figure 3:
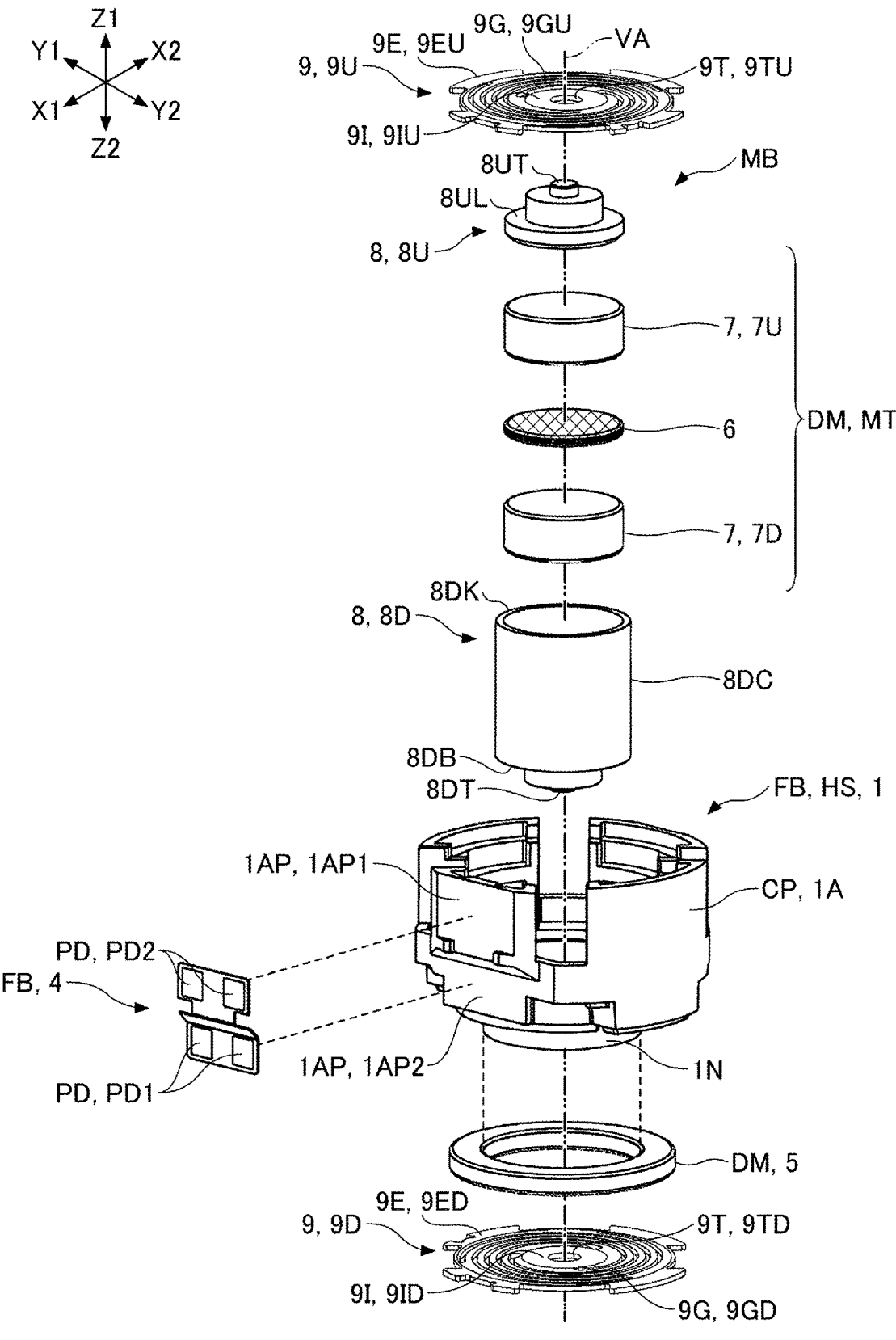
FIG. 3 is an exploded perspective view of members constituting the vibration generating device.

Here, the movable body MB will be described in detail with reference to FIG. 3. FIG. 3 is an exploded perspective view of the first fixed case member 1, the wiring substrate 4, the coil 5, the support member 9, and the movable body MB. Specifically, the movable body MB includes a magnetic field generator MT and a movable case 8, and is configured to be elastically supported by the support member 9. More specifically, the movable body MB has a predetermined natural frequency, and is configured to reciprocate (vibrate) with respect to the fixed case HS along the vibration axis VA extending in a predetermined direction (the Z-axis direction).

The magnetic field generator MT is configured to generate a magnetic field in a state in which the magnetic field generator MT can reciprocate (vibrate) with respect to the fixed case HS. In the present embodiment, the magnetic field generator MT includes a permanent magnet 6 and pole pieces 7. In the illustrated example, the permanent magnet 6 is a disc-shaped solid neodymium magnet magnetized to two poles in the Z-axis direction. However, the permanent magnet 6 may be a cylindrical or annular permanent magnet.

The pole piece 7 is configured to control the path of lines of magnetic force of the magnetic field generated by the permanent magnet 6. In the present embodiment, the size of the pole piece 7 is determined to function as a weight for achieving a predetermined weight, and the pole pieces 7 include a first pole piece 7U disposed on the upper side (the Z1 side) of the permanent magnet 6 and a second pole piece 7D disposed on the lower side (the Z2 side) of the permanent magnet 6. In the illustrated example, the pole piece 7 is a solid cylindrical magnetic member and is formed of cold rolled steel sheets. Here, the pole piece 7 may be a hollow cylindrical or annular magnetic member. Then, the first pole piece 7U is attracted to the upper surface of the permanent magnet 6, and the second pole piece 7D is attracted to the lower surface of the permanent magnet 6. Here, the permanent magnet 6 and the pole pieces 7 may be joined (fixed) to each other by an adhesive. Additionally, in the illustrated example, the first pole piece 7U and the second pole piece 7D are formed to have the same shape. That is, the first pole piece 7U and the second pole piece 7D are the same components.

A driver DM is an example of a vibration force generator, and is configured to vibrate the movable body MB along the vibration axis VA with respect to the fixed body FB. In the present embodiment, the driver DM is an electromagnetic drive mechanism and is configured to include the coil 5 and the magnetic field generator MT. Specifically, the driver DM is configured to vibrate the movable body MB (the magnetic field generator MT) elastically supported by the support member 9 along the vibration axis VA by using an electromagnetic force in accordance with the direction and magnitude of the current supplied to the coil 5 under the control of the controller CTR.

The movable case 8 is a member for fixing the magnetic field generator MT to the support member 9. In the present embodiment, the movable case 8 is a member that is cast to include a non-magnetic metal, such as aluminum or zinc, and includes a first movable case member 8U and a second movable case member 8D. In the illustrated example, the movable case 8 is a die-cast zinc alloy configured to function as a weight for achieving a predetermined weight.

Specifically, the first movable case member 8U includes a cover 8UL and a protrusion 8UT provided at an upper end of the cover 8UL. The second movable case member 8D includes a bottom 8DB, a tube 8DC extending along the vibration axis VA from an outer edge of the bottom 8DB, an opening edge 8DK formed at an end of the tube 8DC, and a protrusion 8DT provided at a lower end of the bottom 8DB. Here, in the illustrated example, two members (the first movable case member 8U and the second movable case member 8D) that can be separated from each other constitute the movable case 8, but three or more components that can be separated from each other may constitute the movable case 8. Additionally, the multiple movable case members that can be separated from each other need not necessarily be in direct contact with each other.

The support member 9 is disposed between the fixed body FB and the movable body MB and is configured to elastically support the movable body MB such that the movable body MB can vibrate with respect to the fixed body FB. In the present embodiment, the support member 9 is a plate spring member formed of metal, such as stainless steel, and includes, as illustrated in FIG. 1, an outer end portion 9E fixed to the fixed body FB (the first fixed case member 1), an inner end portion 9I fixed to the movable body MB (the movable case 8), and an elastic arm 9G elastically connecting the outer end portion 9E and the inner end portion 9I. A through-hole 9T used for joining with the movable case 8 is formed in the inner end portion 9I.

In the illustrated example, the support member 9 includes a first plate spring member 9U disposed between the first fixed case member 1 and the first movable case member 8U, and a second plate spring member 9D disposed between the second fixed case member 2 and the second movable case member 8D. The first plate spring member 9U includes a first outer end portion 9EU, a first inner end portion 9IU, and a first elastic arm 9GU, and the second plate spring member 9D includes a second outer end portion 9ED, a second inner end portion 9ID, and a second elastic arm 9GD. Additionally, in the illustrated example, the first plate spring member 9U and the second plate spring member 9D are formed to have the same shape. That is, the first plate spring member 9U and the second plate spring member 9D are the same components.

Specifically, the first outer end portion 9EU of the first plate spring member 9U is joined to the upper end of the first fixed case member 1 by an adhesive in a state of being placed on a step ST (an upper step 1S) provided at the upper end of the first fixed case member 1. Similarly, the second outer end portion 9ED of the second plate spring member 9D is joined to the lower end of the second fixed case member 2 by an adhesive in a state of being placed on the step ST (a lower step 2S) provided at the upper end of the second fixed case member 2.

Additionally, the first inner end portion 9IU of the first plate spring member 9U is joined to the upper end of the first movable case member 8U by an adhesive in a state where the protrusion 8UT provided at the upper end of the first movable case member 8U is inserted into a first through-hole 9TU formed in the first inner end portion 9IU. Similarly, the second inner end portion 9ID of the second plate spring member 9D is joined to the lower end portion of the second movable case member 8D by an adhesive in a state where the protrusion 8DT provided at the lower end of the second movable case member 8D is inserted into a second through-hole 9TD formed in the second inner end portion 9ID.

Figure 4:
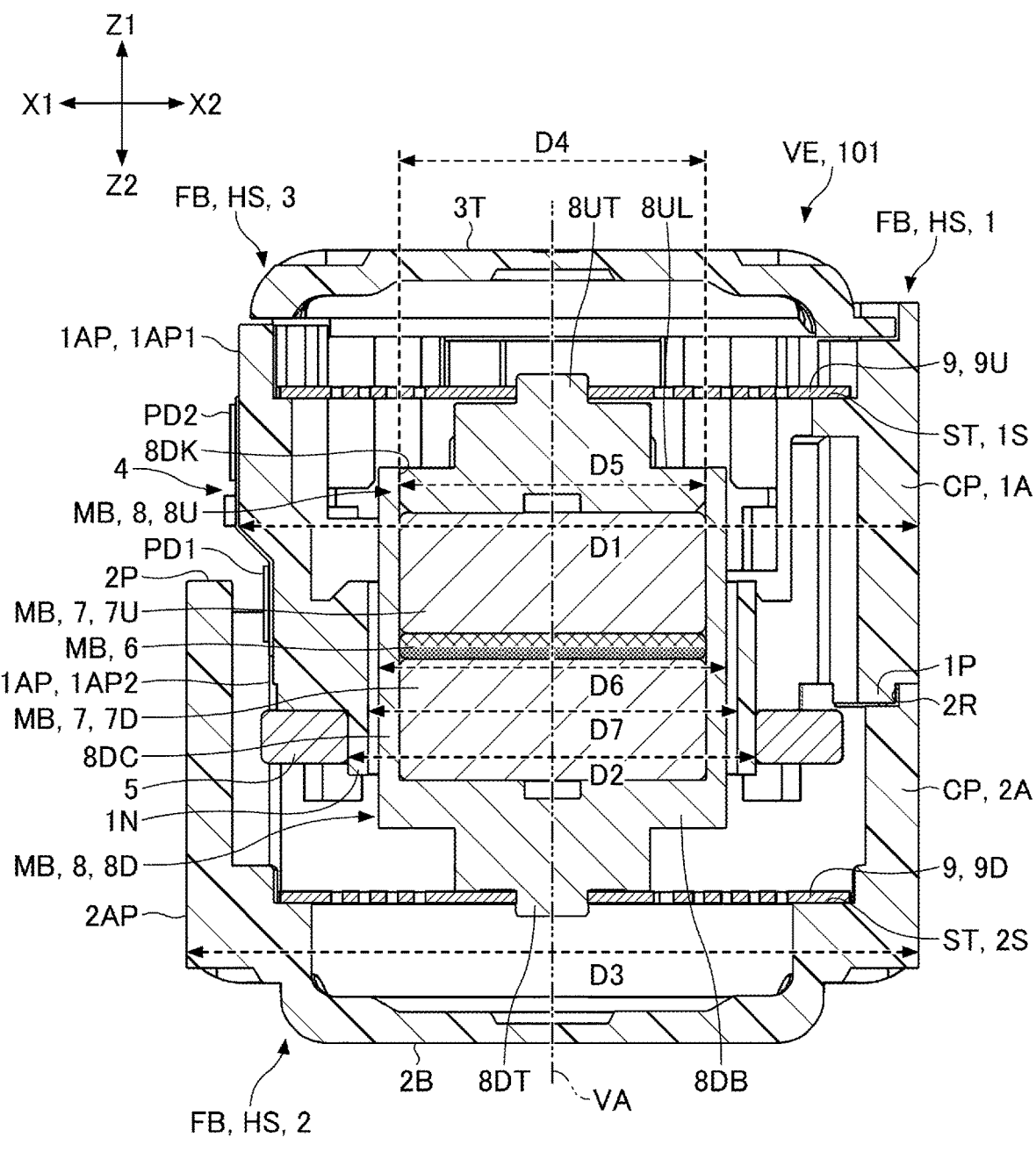
FIG. 4 is a cross-sectional view of the vibration generating device.

Next, the vibration generating device 101 will be described in detail with reference to FIG. 4. FIG. 4 is a cross-sectional view of the vibration generating device 101. Specifically, FIG. 4 illustrates a state where a cross section of the vibration generating device 101 in a virtual plane parallel to the XZ plane including the section line L1 in FIG. 1 is viewed from the right side (the Y2 side). In FIG. 4, for the sake of clarity, a cross pattern is applied to an N-pole portion of the permanent magnet 6, and a dot pattern is applied to an S-pole portion of the permanent magnet 6. The same applies to the other drawings illustrating the polarities of the permanent magnet 6.

The first fixed case member 1 has the inner cylinder 1N that is located inside the first outer cylinder 1A and extends along the vertical direction. Specifically, the inner cylinder 1N has an outer diameter D2 less than an outer diameter D1 of the first outer cylinder 1A. The second outer cylinder 2A of the second fixed case member 2 is attached to the lower end of the first outer cylinder 1A so as to cover the inner cylinder 1N. Then, the coil 5 wound around the inner cylinder 1N is covered by the second outer cylinder 2A. An outer diameter D3 of the second outer cylinder 2A in the right side view as illustrated in FIG. 4 is greater than the outer diameter D1 of the first outer cylinder 1A. This is because the flat surface 1AP of the first outer cylinder 1A is configured to be located on a side closer to the vibration axis VA than the flat surface 2AP of the second outer cylinder 2A. However, for example, in a direction parallel to the Y-axis direction, the outer diameter of the first outer cylinder 1A and the outer diameter of the second outer cylinder 2A are equal to each other.

As illustrated in FIG. 4, the cover 8UL of the first movable case member 8U is configured such that an outer diameter D4 of the cover 8UL is less than an inner diameter D5 of the opening edge 8DK of the second movable case member 8D and the cover 8UL is fixed to the inner side of the opening edge 8DK by an adhesive.

Additionally, the opening edge 8DK is configured such that an inner diameter D5 of the opening edge 8DK, which is also an inner diameter of the tube 8DC of the second movable case member 8D, is substantially equal to the outer diameter of each of the permanent magnet 6, the first pole piece 7U, and the second pole piece 7D. That is, each of the permanent magnet 6, the first pole piece 7U, and the second pole piece 7D is configured to be fit into the tube 8DC. This configuration provides an effect that the movement of the permanent magnet 6, the first pole piece 7U, and the second pole piece 7D in a radial direction of a circle centered on the vibration axis VA in the tube 8DC can be suppressed. That is, this configuration provides an effect that the positioning of the permanent magnet 6, the first pole piece 7U, and the second pole piece 7D in the radial direction can be achieved by the tube 8DC of the second movable case member 8D. Additionally, this configuration provides an effect that a rattling movement of the permanent magnet 6, the first pole piece 7U, and the second pole piece 7D in the radial direction can be suppressed or prevented by the tube 8DC of the second movable case member 8D.

Additionally, the tube 8DC of the second movable case member 8D is configured such that an outer diameter D6 thereof, which is the maximum outer diameter of the movable body MB, is less than an inner diameter D7 of the inner cylinder 1N, which is the minimum inner diameter of the fixed body FB. This configuration provides an effect that the movable body MB can be vibrated along the vibration axis VA without bringing the movable body MB and the fixed body FB into contact with each other.

Figure 5:
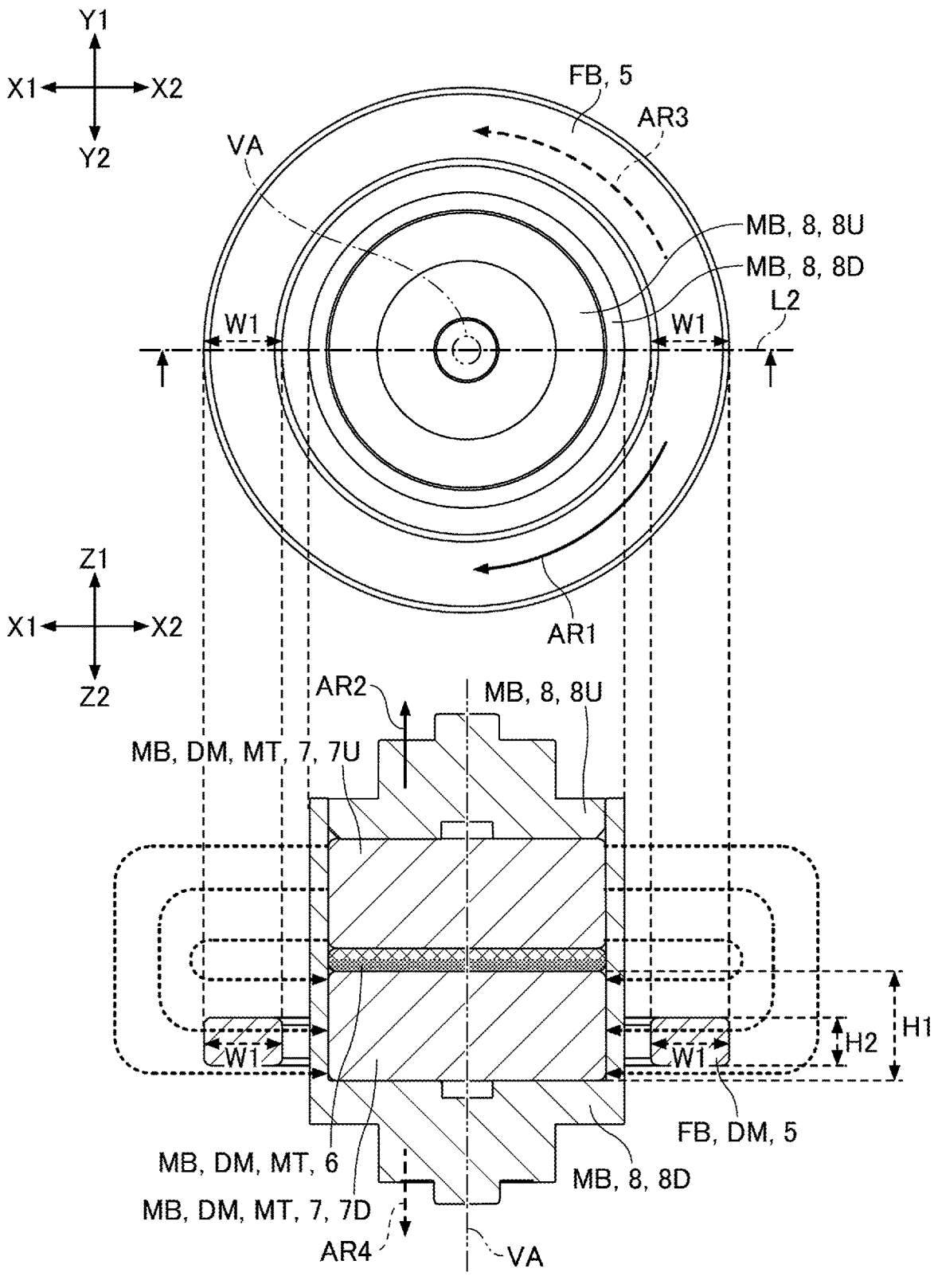
FIG. 5 is a view of a coil and a movable body constituting the vibration generating device.

Next, the movement (the vibration) of the movable body MB in the fixed body FB will be described with reference to FIG. 5. FIG. 5 is a view of the coil 5 and the movable body MB. In FIG. 5, for easy understanding of the description, members other than the coil 5 and the movable body MB are omitted. Specifically, the upper drawing of FIG. 5 is a top view of the coil 5 and the movable body MB, and the lower drawing of FIG. 5 is a cross-sectional view of the coil 5 and the movable body MB. More specifically, the lower drawing of FIG. 5 illustrates a state where a cross section of the coil 5 and the movable body MB in a virtual plane parallel to the XZ plane including the section line L2 in the upper drawing of FIG. 5 is viewed from the right side (the Y2 side). Additionally, thick dotted arrows in the lower drawing of FIG. 5 schematically illustrate lines of magnetic force related to the magnetic field generated by the magnetic field generator MT.

As illustrated in the lower drawing of FIG. 5, the permanent magnet 6 is disposed between the first pole piece 7U and the second pole piece 7D in the vertical direction such that the upper portion of the permanent magnet 6 is the N-pole portion and the lower portion of the permanent magnet 6 is the S-pole portion. Therefore, the first pole piece 7U that is in contact with the N-pole portion of the permanent magnet 6 is magnetized to the N-pole, and the second pole piece 7D that is in contact with the S-pole portion of the permanent magnet 6 is magnetized to the S-pole. As a result, as indicated by dotted arrows, lines of magnetic force representing the magnetic field generated by the magnetic field generator MT extend outward from the first pole piece 7U located inside a circle centered on the vibration axis VA in the radial direction, pass through the coil 5 from the outside to the inside in the radial direction, and then enter the second pole piece 7D located further inside in the radial direction.

In such a magnetic field, when a current flows through the coil 5 as indicated by the solid arrow AR1 in the upper drawing of FIG. 5 (clockwise around the vibration axis VA in the top view), the movable body MB moves to the upper side (the Z1 side) as indicated by the solid arrow AR2 in the lower drawing of FIG. 5 due to the reaction force of the Lorentz force that acts on the coil 5. When the movable body MB moves upward, the support member 9 serving as the plate spring member is elastically deformed to generate a restoring force for pushing back the movable body MB downward (the Z2 side). Therefore, when the current flowing through the coil 5 disappears and the reaction force of the Lorentz force disappears, the movable body MB that has moved upward attempts to move downward by the restoring force of the support member 9 to return to the neutral position. The neutral position of the movable body MB is a position when the support member 9 is not elastically deformed, and the lower drawing of FIG. 5 illustrates a state where the movable body MB is at the neutral position, and in this state, no current flows in the coil 5. Here, FIG. 4 also illustrates a state where the movable body MB is at the neutral position.

When the movable body MB is at the neutral position, if the current flows through the coil 5 as indicated by the dashed arrow AR3 in the upper drawing of FIG. 5 (counterclockwise around the vibration axis VA in the top view), the movable body MB moves downward (the Z2 side) as indicated by the dashed arrow AR4 in the lower drawing of FIG. 5 due to the reaction force of the Lorentz force that acts on the coil 5. When the movable body MB moves downward, the support member 9 serving as the plate spring member is elastically deformed to generate a restoring force for pushing back the movable body MB to the upper side (the Z1 side). Therefore, when the current flowing through the coil 5 disappears and the reaction force of the Lorentz force disappears, the movable body MB that has moved downward attempts to move upward by the restoring force of the support member 9 to return to the neutral position.

The controller CTR can repeatedly vibrate the movable body MB in the vertical direction by using the force acting as described above, for example, by alternately reversing the direction of the current flowing in the coil 5.

Additionally, in the illustrated example, as illustrated in the lower drawing of FIG. 5, the coil 5 is configured to have a size H2 smaller than a size H1 of the second pole piece 7D in the vertical direction (the Z-axis direction), which is the direction along the vibration axis VA. Additionally, the coil 5 is configured such that a size W1 of the coil cross-section in the radial direction of the circle centered on the vibration axis VA is larger than the size H2 in the direction along the vibration axis VA. That is, the coil 5 is configured to have a horizontally long cross-sectional shape thinner than the second pole piece 7D. Here, the permanent magnet 6 is configured such that the size of the permanent magnet 6 in the direction along the vibration axis VA is smaller than the size H2 of the coil 5. This configuration provides an effect that the driver DM configured to include the coil 5 and the magnetic field generator MT can suppress a change in the driving force caused by the movement of the movable body MB (the magnetic field generator MT).

Figure 6:
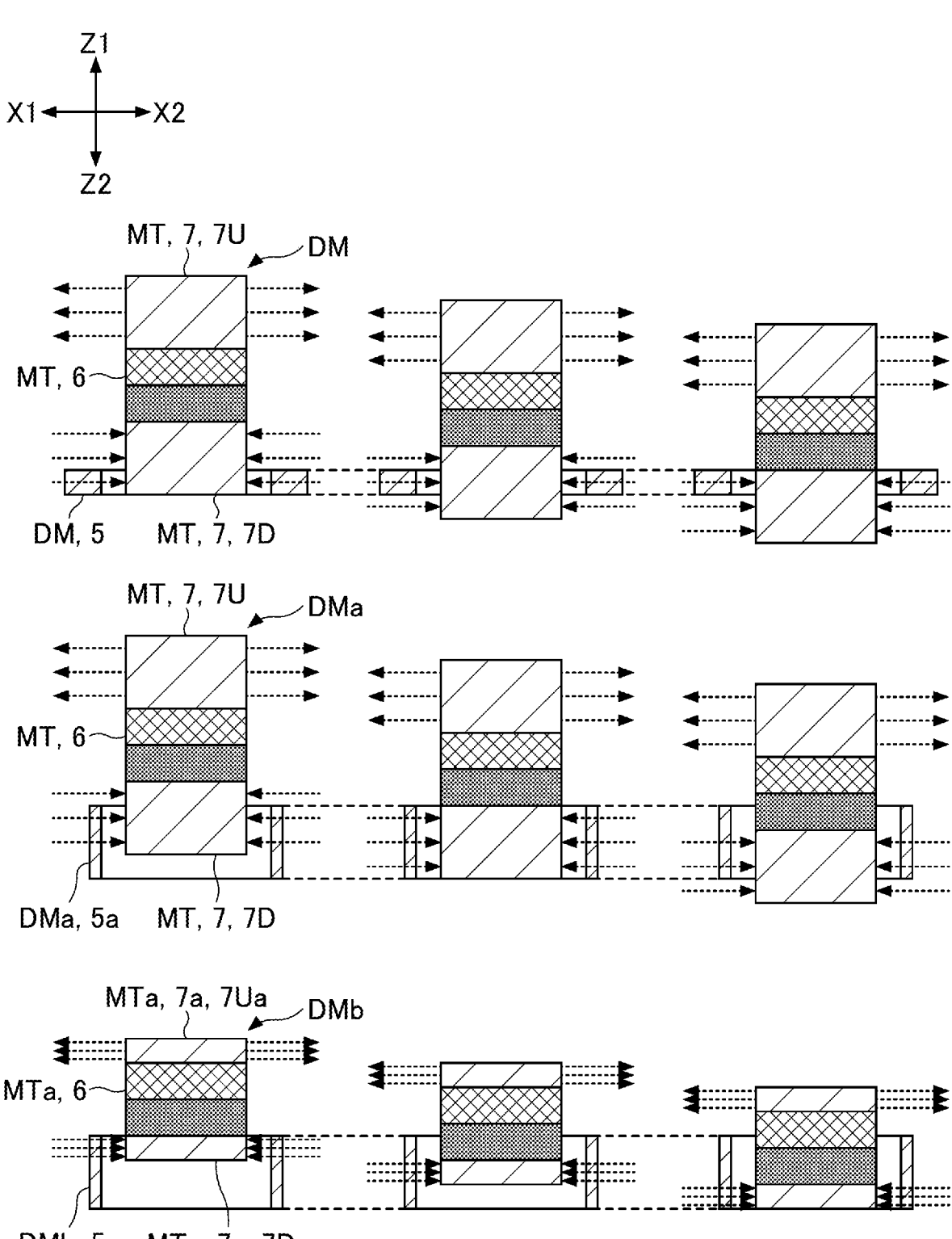
FIG. 6 is a schematic cross-sectional view of a driver constituting the vibration generating device.

Here, this effect will be described with reference to FIG. 6. FIG. 6 is a schematic cross-sectional view of the driver DM (the coil 5 and the magnetic field generator MT) constituting the vibration generating device 101, and corresponds to the lower drawing of FIG. 5. The dashed arrows in FIG. 6 schematically illustrate lines of magnetic force related to the magnetic field generated by the magnetic field generator MT, similar to the dashed arrows in FIG. 5.

Specifically, the three drawings in the upper row of FIG. 6 are schematic cross-sectional views of the driver DM (see the lower drawing of FIG. 5) including the coil 5 and the magnetic field generator MT, the three drawings in the middle row of FIG. 6 are schematic cross-sectional views of a driver DMa, which is another configuration example of the driver DM including a coil 5a, which is another configuration example of the coil 5 and the magnetic field generator MT, and the three drawings in the lower row of FIG. 6 are schematic cross-sectional views of a driver DMb, which is still another configuration example of the driver DM including the coil 5a, which is another configuration example of the coil 5 and a magnetic field generator MTa, which is another configuration example of the magnetic field generator MT. Additionally, the leftmost drawing in the upper row of FIG. 6 illustrates a state where the movable body MB (the magnetic field generator MT) has moved to the uppermost position, the middle drawing in the upper row of FIG. 6 illustrates a state where the movable body MB (the magnetic field generator MT) is at the neutral position, and the rightmost drawing in the upper row of FIG. 6 illustrates a state where the movable body MB (the magnetic field generator MT) has moved to the lowermost position. The same applies to the drawings in the middle and lower rows of FIG. 6.

The coil 5a in the three drawings illustrated in the middle row of FIG. 6 is different from the coil 5 in that the coil 5a has a vertically long cross-sectional shape. That is, the size of the coil 5a in the direction along the vibration axis VA (the vertical direction) is substantially equal to the size of the second pole piece 7D, and the size of the coil cross-section in the radial direction of the circle centered on the vibration axis VA is smaller than the size of the coil cross-section in the vertical direction. Additionally, the coil 5a is configured such that the area of the coil cross-section of the coil 5a is equal to the area of the coil cross-section of the coil 5. Here, the areas of the coil cross-section being equal indicate that the numbers of turns of the wires are equal.

In the example illustrated in the middle row of FIG. 6, the number of lines of magnetic force passing through the coil 5a is smaller when the movable body MB (the magnetic field generator MT) moves to the uppermost position (see the leftmost drawing in the middle row) and when the movable body MB (the magnetic field generator MT) moves to the lowermost position (see the rightmost drawing in the middle row) than when the movable body MB (the magnetic field generator MT) is at the neutral position (see the middle drawing in the middle row). This is because when the movable body MB (the magnetic field generator MT) moves to the uppermost position (see the leftmost drawing in the middle row), a lower end of the coil 5a protrudes to a position relatively lower than the lower end of the second pole piece 7D. Similarly, this is because when the movable body MB (the magnetic field generator MT) moves to the lowermost position (see the rightmost drawing in the middle row), an upper end of the coil 5a protrudes to a position relatively higher than the upper end of the second pole piece 7D. As a result, in the example illustrated in the middle row of FIG. 6, the driving force by the driver DMa is smaller when the movable body MB (the magnetic field generator MT) moves to the uppermost position and when the movable body MB (the magnetic field generator MT) moves to the lowermost position, than when the movable body MB (the magnetic field generator MT) is at the neutral position (see the middle drawing in the middle row).

With respect to the above, in the example illustrated in the upper row of FIG. 6, the driving force by the driver DM does not change regardless of the position of the movable body MB (the magnetic field generator MT) in the vertical direction. This is because the number of lines of magnetic force passing through the coil 5 is identical in any of a case where the movable body MB (the magnetic field generator MT) moves to the uppermost position (see the leftmost drawing in the upper row), a case where the movable body MB (the magnetic field generator MT) is at the neutral position (see the middle drawing in the upper row), and a case where the movable body MB (the magnetic field generator MT) moves to the lowermost position (see the rightmost drawing in the upper row).

The magnetic field generator MTa in the three drawings illustrated in the lower row of FIG. 6 is different from the magnetic field generator MT in that the magnetic field generator MTa includes a pole piece 7a, which is another configuration example of the pole piece 7, that is, the magnetic field generator MTa includes a first pole piece 7Ua, which is another configuration example of the first pole piece 7U, and a second pole piece 7Da, which is another configuration example of the second pole piece 7D. Specifically, in the direction along the vibration axis VA (the vertical direction), the size of the first pole piece 7Ua is smaller than the size of the first pole piece 7U, and in the direction along the vibration axis VA (the vertical direction), the size of the second pole piece 7Da is smaller than the size of the second pole piece 7D. Additionally, in the direction along the vibration axis VA (the vertical direction), the size of each of the first pole piece 7Ua and the second pole piece 7Da is smaller than the size of the coil 5a. Therefore, in the example illustrated in the lower row of FIG. 6, as in the example illustrated in the upper row of FIG. 6, the driving force by the driver DMb does not change regardless of the position of the movable body (the magnetic field generator MTa) in the vertical direction. This is because the number of lines of magnetic force passing through the coil 5a is identical in any of the case where the movable body (the magnetic field generator MTa) moves to the uppermost position (see the leftmost drawing in the lower row), the case where the movable body (the magnetic field generator MTa) is at the neutral position (see the middle drawing in the lower row), and the case where the movable body (the magnetic field generator MTa) moves to the lowermost position (see the rightmost drawing in the lower row). However, because the weight of the magnetic field generator MTa is smaller than the weight of the magnetic field generator MT, the magnitude (the strength) of the vibration generated by the movable body (the magnetic field generator MTa) is smaller than the magnitude (the strength) of the vibration generated by the movable body MB (the magnetic field generator MT).

In order to increase the magnitude of the vibration generated by the movable body (the magnetic field generator MTa), it is only necessary to increase the weight of the magnetic field generator MTa, and for example, it is only necessary to increase the size of each of the first pole piece 7Ua and the second pole piece 7Da in the vertical direction. However, if the size of the second pole piece 7Da in the vertical direction approaches the size of the coil 5a, as in the example illustrated in the middle row of FIG. 6, the driving force by the driver DMb configured to include the coil 5a and the magnetic field generator MTa changes in accordance with the position of the movable body (the magnetic field generator MTa) in the vertical direction.

With respect to the above, in the example illustrated in the upper row of FIG. 6, by reducing the size of the coil 5 in the vertical direction to be smaller than the size of the second pole piece 7D, even when the size of the pole piece 7 in the vertical direction is further increased, the driving force by the driver DM can be prevented from changing in accordance with the position of the movable body MB (the magnetic field generator MT) in the vertical direction. Additionally, in the example illustrated in the upper row of FIG. 6, by increasing the size of the coil cross-section of the coil 5 in the radial direction of the circle centered on the vibration axis VA to be larger than the size of the coil cross-section of the coil 5a, the decrease in the driving force due to the reduction in the size of the coil 5 in the vertical direction can be canceled out (suppressed).

Figure 7:
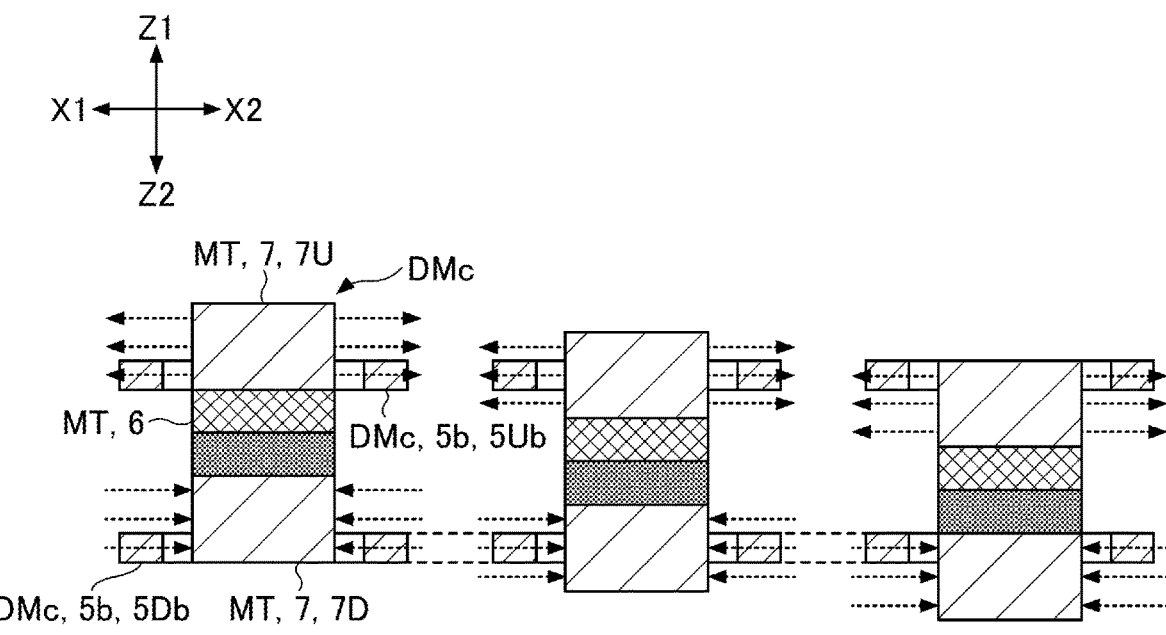
FIG. 7 is a schematic cross-sectional view of the driver constituting the vibration generating device.
Figure 7:
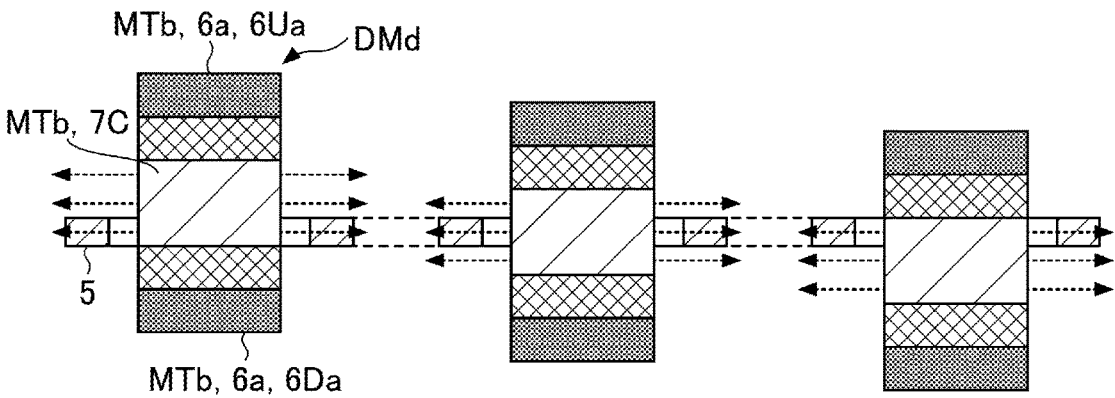

Next, another configuration example of the driver DM will be described with reference to FIG. 7. FIG. 7 is a schematic cross-sectional view of the driver DM (the coil 5 and the magnetic field generator MT) constituting the vibration generating device 101, and corresponds to the lower drawing of FIG. 5 and FIG. 6. The dashed arrows in FIG. 7 schematically indicate the lines of magnetic force related to the magnetic field generated by the magnetic field generator MT, similar to the dashed arrows in FIG. 5 and FIG. 6.

Specifically, the three drawings in the upper row of FIG. 7 are schematic cross-sectional views of a driver DMc, which is still another configuration example of the driver DM including coils 5b, which is still another configuration example of the coil 5, and the magnetic field generator MT. The three drawings in the lower row of FIG. 7 are schematic cross-sectional views of a driver DMd, which is still another configuration example of the driver DM including the coil 5 and a magnetic field generator MTb, which is still another configuration example of the magnetic field generator MT. Additionally, the left diagram in the upper row of FIG. 7 illustrates a state where the movable body MB (the magnetic field generator MT) has moved to the uppermost position, the middle drawing in the upper row of FIG. 7 illustrates a state where the movable body MB (the magnetic field generator MT) is at the neutral position, and the rightmost drawing in the upper row of FIG. 7 illustrates a state where the movable body MB (the magnetic field generator MT) has moved to the lowermost position. The same applies to the lower row of FIG. 7.

The driver DMc in the three drawings illustrated in the upper row of FIG. 7 is different from the driver DM in that the driver DMc includes the coils 5b instead of the coil 5. Specifically, the coil 5b is different from the coil 5 in that the coils 5b include a first coil 5Ub disposed on the outer side of the first pole piece 7U (i.e., disposed to face the outer side of the first pole piece 7U), separately from a second coil 5Db (corresponding to the coil 5) disposed on the outer side of the second pole piece 7D (i.e., disposed to face the outer side of the second pole piece 7D). In the illustrated example, the first coil 5Ub and the second coil 5Db are connected in series and are arranged such that the winding directions are opposite to each other in a top view along the vibration axis VA. Additionally, each of the first coil 5Ub and the second coil 5Db is configured such that the size is equal to the size of the coil 5 in the direction along the vibration axis VA (the vertical direction), and the size of the coil cross-section is equal to the size of the coil cross-section of the coil 5 in the radial direction of the circle centered on the vibration axis VA. Additionally, the first coil 5Ub is wound around another inner cylinder (not illustrated) substantially the same as the inner cylinder 1N formed in the first fixed case member 1.

With this configuration, the driver DMc can achieve the same effect as the effect of the driver DM, that is, the effect that a change in the driving force caused by the movement of the movable body MB (the magnetic field generator MT) can be suppressed, and further, can provide an additional effect that a driving force larger than the driving force generated by the driver DM can be generated.

Here, the configuration in which the first coil 5Ub is disposed on the outer side of the first pole piece 7U and the second coil 5Db is disposed on the outer side of the second pole piece 7D may be applied to the configurations illustrated in each of the middle row and lower row of FIG. 6.

The driver DMd in the three drawings illustrated in the lower row of FIG. 7 is different from the driver DM in that the driver DMd includes a magnetic field generator MTb. Specifically, the magnetic field generator MTb is different from the magnetic field generator MT in that the magnetic field generator MTb includes one central pole piece 7C and permanent magnets 6a arranged on both sides of the central pole piece 7C in the vertical direction. More specifically, the permanent magnets 6a include a first permanent magnet 6Ua disposed on the upper side of the central pole piece 7C and a second permanent magnet 6Da disposed on the lower side of the central pole piece 7C. In the illustrated example, the first permanent magnet 6Ua and the second permanent magnet 6Da are the same components (permanent magnets) as the permanent magnet 6 in the driver DM, and the central pole piece 7C is the same component (pole piece) as each of the first pole piece 7U and the second pole piece 7D in the driver DM.

With this configuration, the driver DMd can achieve the same effect as the effect of the driver DM, that is, the effect that a change in the driving force accompanied by the movement of the movable body MB (the magnetic field generator MT) can be suppressed, and further, can provide an additional effect that a driving force larger than the driving force generated by the driver DM can be generated.

Here, the configuration in which the permanent magnets 6a (the first permanent magnet 6Da and the second permanent magnet 6Ua) are disposed on both sides of one central pole piece 7C may be applied to the configuration illustrated in each of the middle row and lower row of FIG. 6.

Figure 8:
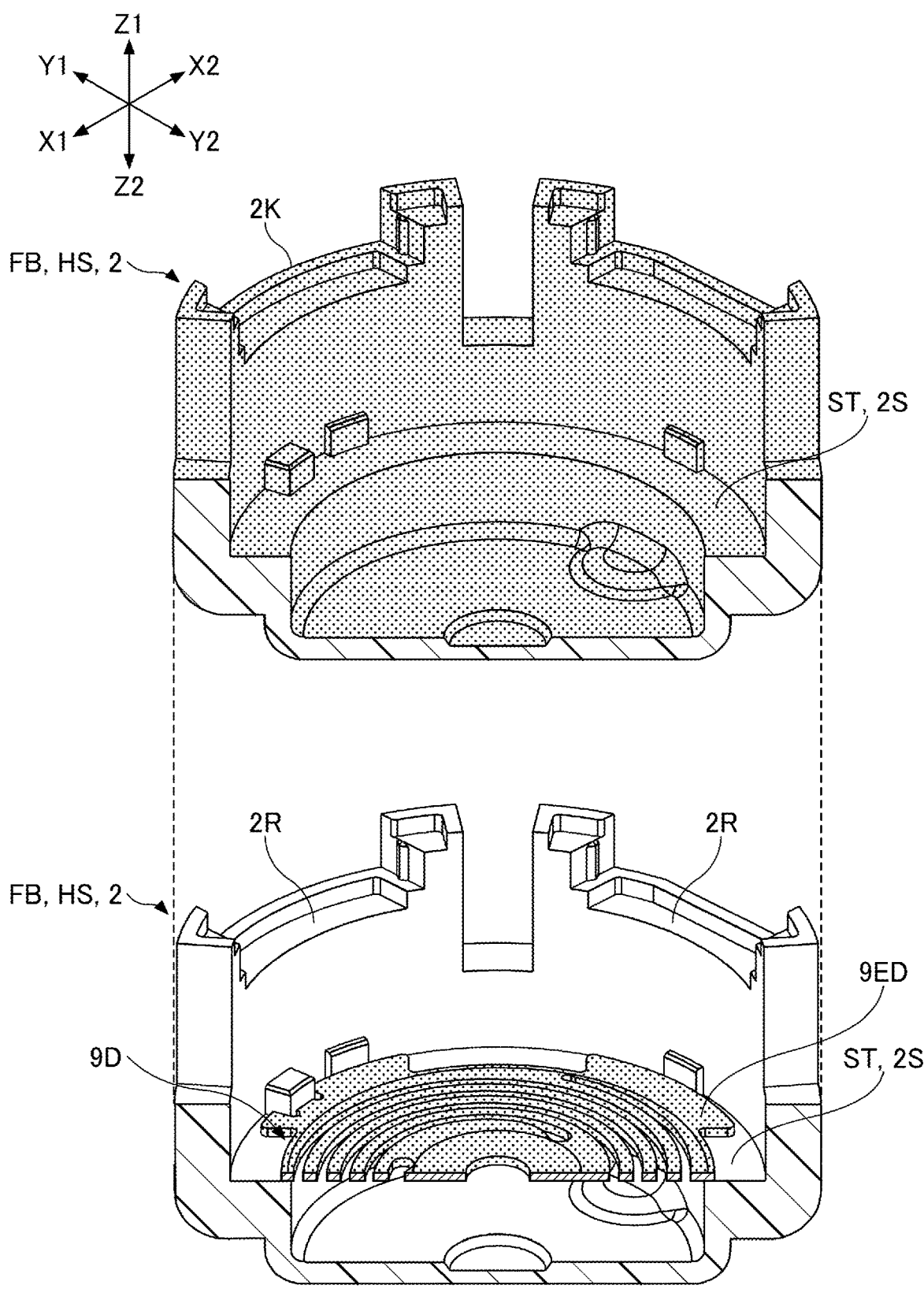
FIG. 8 is a cross-sectional view of the members constituting the vibration generating device.
Figure 9:
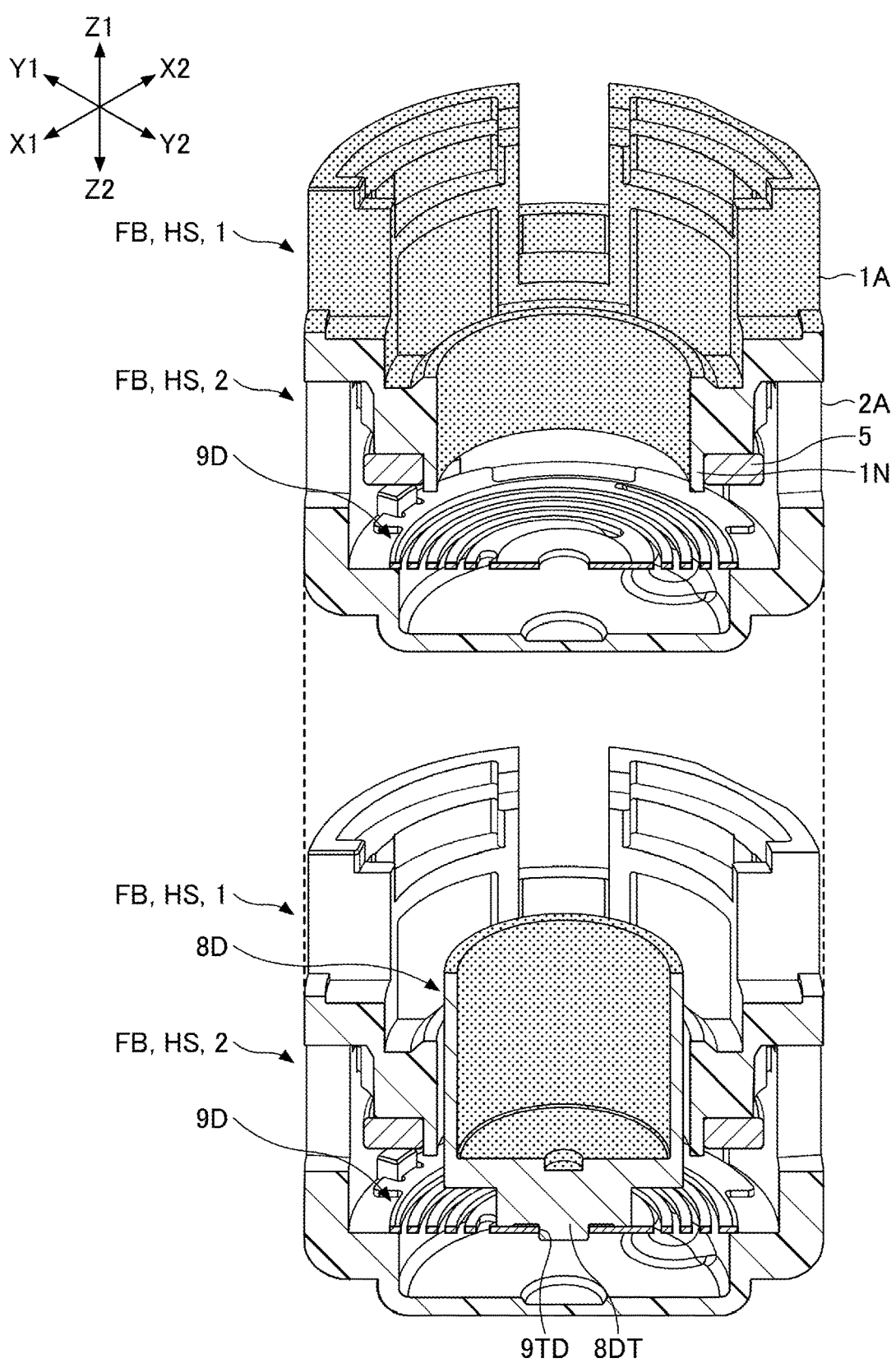
FIG. 9 is a cross-sectional view of the members constituting the vibration generating device.
Figure 10:
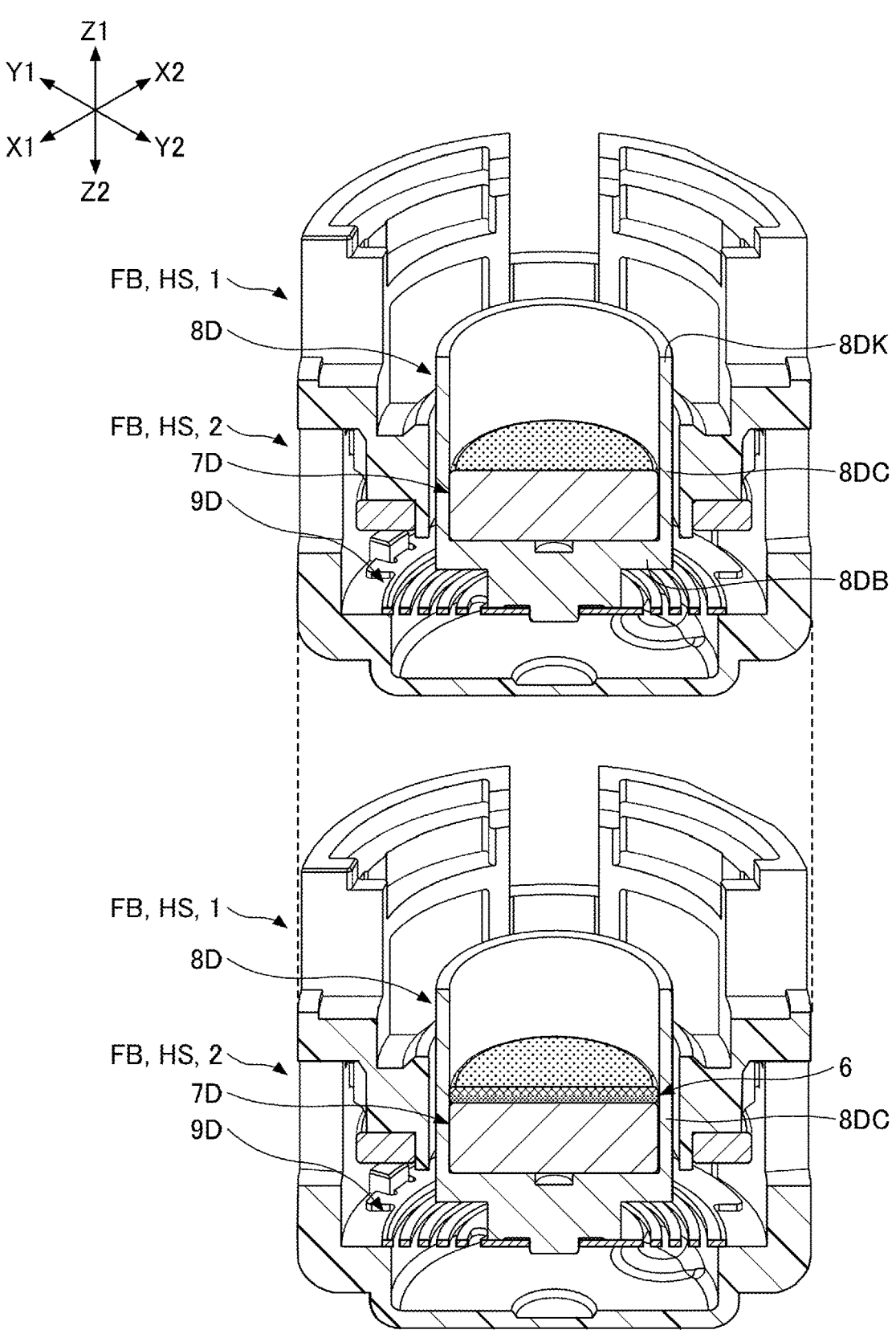
FIG. 10 is a cross-sectional view of the members constituting the vibration generating device.
Figure 11:
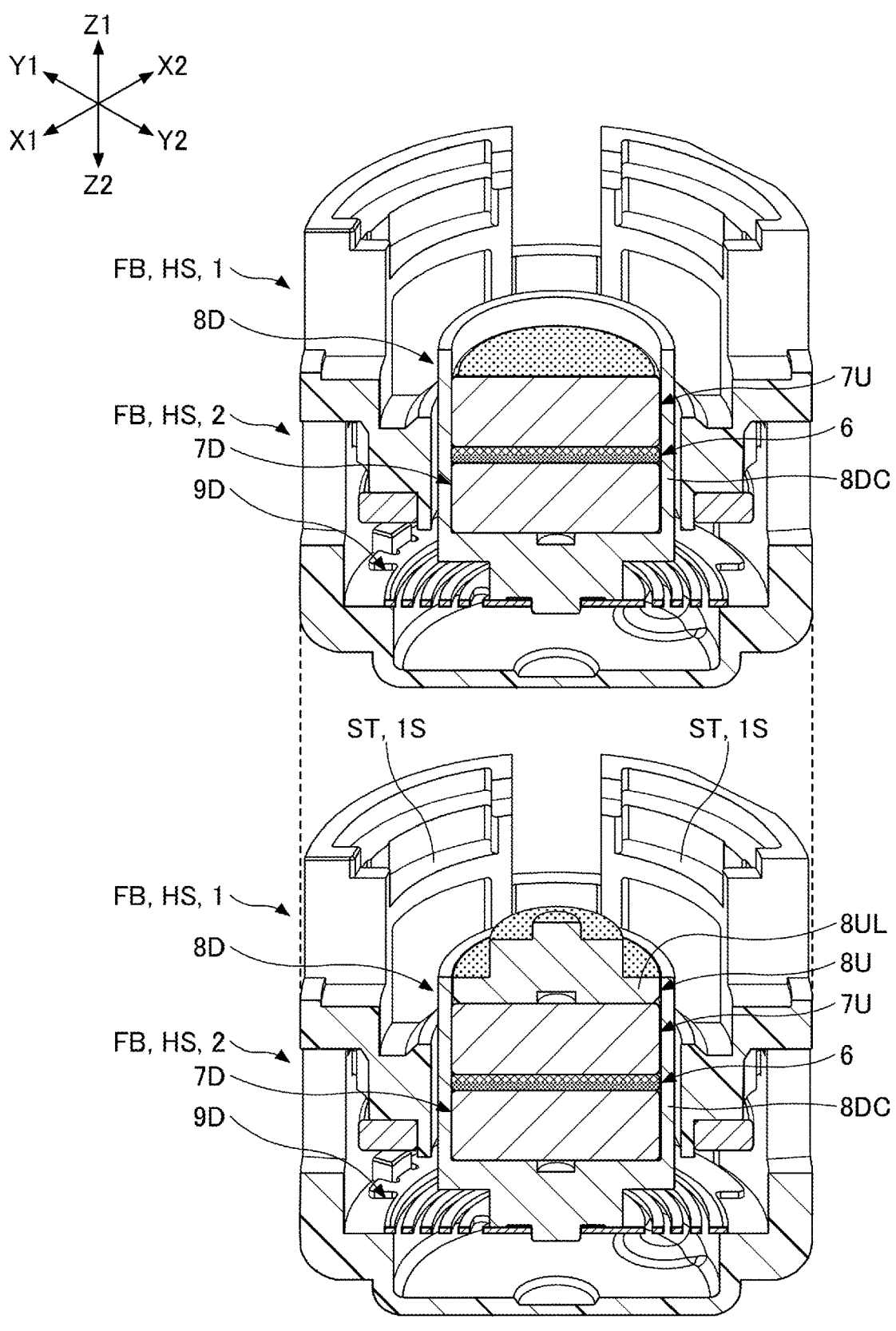
FIG. 11 is a cross-sectional view of the members constituting the vibration generating device.
Figure 12:
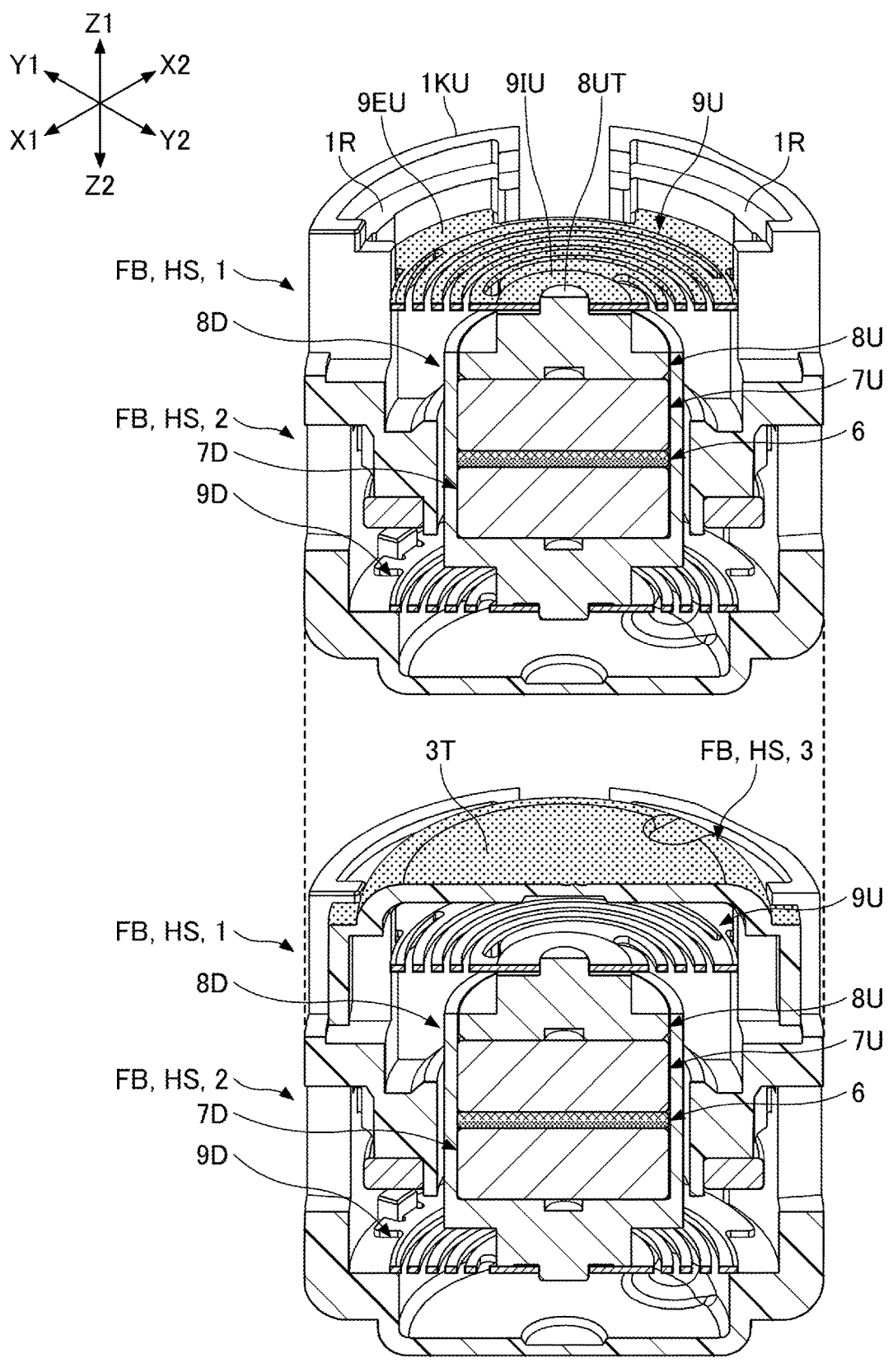
FIG. 12 is a cross-sectional view of the members constituting the vibration generating device.

Next, a method of manufacturing (a method of assembling) the vibration generating device 101 will be described with reference to FIG. 8 to FIG. 12. FIG. 8 to FIG. 12 are cross-sectional views of one or more members constituting the vibration generating device 101. Specifically, FIG. 8 to FIG. 12 illustrate a state where a cross section of one or more members constituting the vibration generating device 101 in a virtual plane parallel to the XZ plane including the section line L3 of FIG. 1 is viewed from the right front side, and the number of members illustrated in the drawings increases in the order of FIG. 8 to FIG. 12. In FIG. 8 to FIG. 12, for easier understanding, a dot pattern is applied to a newly added member. More specifically, the upper drawing of FIG. 8 is a cross-sectional view of the second fixed case member 2, and the lower drawing of FIG. 8 is a drawing in which a cross-sectional view of the second plate spring member 9D is added to the upper drawing of FIG. 8. Additionally, the upper drawing of FIG. 9 is a drawing in which a cross-sectional view of the first fixed case member 1 is added to the lower drawing of FIG. 8, and the lower drawing of FIG. 9 is a drawing in which a cross-sectional view of the second movable case member 8D is added to the upper drawing of FIG. 9. Additionally, the upper drawing of FIG. 10 is a drawing in which a cross-sectional view of the second pole piece 7D is added to the lower drawing of FIG. 9, and the lower drawing of FIG. 10 is a drawing in which a cross-sectional view of the permanent magnet 6 is added to the upper drawing of FIG. 10. Additionally, the upper drawing of FIG. 11 is a drawing in which a cross-sectional view of the first pole piece 7U is added to the lower drawing of FIG. 10, and the lower drawing of FIG. 11 is a drawing in which a cross-sectional view of the first movable case member 8U is added to the upper drawing of FIG. 11. Additionally, the upper drawing of FIG. 12 is a drawing in which a cross-sectional view of the first plate spring member 9U is added to the lower drawing of FIG. 11, and the lower drawing of FIG. 12 is a drawing in which a cross-sectional view of the third fixed case member 3 is added to the upper drawing of FIG. 12.

In the assembly of the vibration generating device 101, first, the second fixed case member 2 is placed on a workbench in a state where the opening edge 2K faces upward as illustrated in the upper drawing of FIG. 8.

Subsequently, as illustrated in the lower drawing of FIG. 8, the second plate spring member 9D is attached to the inside of the second fixed case member 2 from above. Specifically, the second plate spring member 9D is attached to the inside of the second fixed case member 2 such that the second outer end portion 9ED and the substantially annular step ST (the lower step 2S) formed inside the second fixed case member 2 are in contact with each other. In the illustrated example, the second outer end portion 9ED of the second plate spring member 9D is joined to the lower step 2S of the second fixed case member 2 by an adhesive.

Subsequently, as illustrated in the upper drawing of FIG. 9, the first fixed case member 1 is attached to the second fixed case member 2 from above. Specifically, the first fixed case member 1 is attached to the opening edge 2K of the second fixed case member 2 such that three protrusions 1P (see FIG. 2) formed at the lower opening edge 1KD of the first fixed case member 1 are fit into three recesses 2R (see FIG. 1) formed at the opening edge 2K of the second fixed case member 2. Here, in the illustrated example, the first fixed case member 1 is attached to the second fixed case member 2 in a state where the coil 5 is wound around the inner cylinder 1N and the wiring substrate 4 is attached to the flat surface 1AP of the first outer cylinder 1A. Additionally, the first fixed case member 1 is joined to the second fixed case member 2 by an adhesive. Additionally, the first fixed case member 1 is attached to the second fixed case member 2 such that the partial cylindrical surface of the first outer cylinder 1A and the partial cylindrical surface of the second outer cylinder 2A are substantially flush with each other.

Subsequently, as illustrated in the lower drawing of FIG. 9, the second movable case member 8D is attached to the second plate spring member 9D from above. More specifically, the second movable case member 8D is attached to the second inner end portion 9ID of the second plate spring member 9D such that the protrusion 8DT is inserted into the second through-hole 9TD formed in the second inner end portion 9ID of the second plate spring member 9D. In the illustrated example, the protrusion 8DT of the second movable case member 8D is joined to the second inner end portion 9ID of the second plate spring member 9D by an adhesive.

Subsequently, as illustrated in the upper drawing of FIG. 10, the second pole piece 7D is attached to the second movable case member 8D from above. Specifically, the second pole piece 7D is attached to the second movable case member 8D such that the second pole piece 7D is fit into the tube 8DC of the second movable case member 8D from above the opening edge 8DK of the second movable case member 8D. Here, in the illustrated example, the second pole piece 7D is fit into the tube 8DC until the lower surface (the surface on the Z2 side) comes into contact with the upper surface (the surface on the Z1 side) of the bottom 8DB of the second movable case member 8D. Additionally, in the illustrated example, the lower surface of the second pole piece 7D is joined to the upper surface of the bottom 8DB of the second movable case member 8D by an adhesive, and the outer circumferential surface of the second pole piece 7D is joined to the inner circumferential surface of the tube 8DC by an adhesive.

Subsequently, as illustrated in the lower drawing of FIG. 10, the permanent magnet 6 is attached to the second movable case member 8D from above. Specifically, the permanent magnet 6 is attached to the second movable case member 8D such that the permanent magnet 6 is fit into the tube 8DC of the second movable case member 8D from above the opening edge 8DK of the second movable case member 8D, similar to the second pole piece 7D. Here, in the illustrated example, the permanent magnet 6 is fit into the tube 8DC until the lower surface (the surface on the Z2 side) comes into contact with the upper surface (the surface on the Z1 side) of the second pole piece 7D. Additionally, in the illustrated example, the permanent magnet 6 is fixed to the second pole piece 7D by the magnetic force thereof. However, the lower surface of the permanent magnet 6 may be joined to the upper surface of the second pole piece 7D by an adhesive, and the outer circumferential surface of the permanent magnet 6 may be joined to the inner circumferential surface of the tube 8DC by an adhesive.

Subsequently, as illustrated in the upper drawing of FIG. 11, the first pole piece 7U is attached to the second movable case member 8D from above. Specifically, the first pole piece 7U is attached to the second movable case member 8D such that the first pole piece 7U is fit into the tube 8DC of the second movable case member 8D from above the opening edge 8DK of the second movable case member 8D, similar to the second pole piece 7D and the permanent magnet 6. Here, in the illustrated example, the first pole piece 7U is fit into the tube 8DC until the lower surface (the surface on the Z2 side) comes into contact with the upper surface (the surface on the Z1 side) of the permanent magnet 6. Additionally, in the illustrated example, the first pole piece 7U is fixed to the permanent magnet 6 by the magnetic force of the permanent magnet 6. However, the lower surface of the first pole piece 7U may be joined to the upper surface of the permanent magnet 6 by an adhesive, and the outer circumferential surface of the first pole piece 7U may be joined to the inner circumferential surface of the tube 8DC by an adhesive.

Subsequently, as illustrated in the lower drawing of FIG. 11, the first movable case member 8U is attached to the second movable case member 8D from above. Specifically, the first movable case member 8U is attached to the second movable case member 8D such that the cover 8UL is fit into the tube 8DC of the second movable case member 8D from above the opening edge 8DK of the second movable case member 8D, similar to the second pole piece 7D, the permanent magnet 6, and the first pole piece 7U. Here, in the illustrated example, the cover 8UL of the first movable case member 8U is fit into the tube 8DC until the lower surface (the surface on the Z2 side) comes into contact with the upper surface (the surface on the Z1 side) of the first pole piece 7U. Additionally, in the illustrated example, the lower surface of the cover 8UL is joined to the upper surface of the first pole piece 7U by an adhesive, and the outer circumferential surface of the cover 8UL is joined to the inner circumferential surface of the tube 8DC by an adhesive.

Subsequently, as illustrated in the upper drawing of FIG. 12, the first plate spring member 9U is attached to the first fixed case member 1 and the first movable case member 8U from above. Specifically, the first plate spring member 9U is attached to the protrusion 8UT of the first movable case member 8U such that the protrusion 8UT of the first movable case member 8U is inserted into the first through-hole 9TU formed in the first inner end portion 9IU. Additionally, the first plate spring member 9U is attached to the inside of the first fixed case member 1 such that the first outer end portion 9EU is in contact with four partially annular steps ST (the upper steps 1S) formed inside the first fixed case member 1. In the illustrated example, the first inner end portion 9IU of the first plate spring member 9U is joined to the protrusion 8UT of the first movable case member 8U by an adhesive, and the first outer end portion 9EU of the first plate spring member 9U is joined to the upper step 1S of the first fixed case member 1 by an adhesive.

Subsequently, as illustrated in the lower drawing of FIG. 12, the third fixed case member 3 is attached to the first fixed case member 1 from above. Specifically, the third fixed case member 3 is attached to the upper opening edge 1KU of the first fixed case member 1 such that the four cutouts 1C (see FIG. 1) formed at the upper opening edge 1KU of the first fixed case member 1 are fit into four protrusions 3G (see FIG. 2) formed to extend downward from the outer edge of the top plate 3T of the third fixed case member 3, and the three recesses 1R (see FIG. 1) formed at the upper opening edge 1KU of the first fixed case member 1 are fit into the three flanges 3F (see FIG. 1) formed to extend outward from the outer edge of the top plate 3T of the third fixed case member 3. Here, in the illustrated example, the flange 3F of the third fixed case member 3 is joined to the recess 1R of the upper opening edge 1KU of the first fixed case member 1 by an adhesive.

As described above, the vibration generating device 101 is assembled by stacking the second fixed case member 2, the second plate spring member 9D, the first fixed case member 1, the second movable case member 8D, the second pole piece 7D, the permanent magnet 6, the first pole piece 7U, the first movable case member 8U, the first plate spring member 9U, and the third fixed case member 3 in order from the bottom. Therefore, the vibration generating device 101 can be assembled relatively easily without using a jig or the like for positioning the members. Particularly, because the first movable case member 8U, the first pole piece 7U, the permanent magnet 6, and the second pole piece 7D are fit into the tube 8DC of the second movable case member 8D, they do not need to be assembled in a state of being guided in the radial direction by a jig or the like in a separate process, and assembly misalignment (the center of each member deviates from the vibration axis VA) does not occur. Therefore, this configuration can reduce the manufacturing cost of the vibration generating device 101 more than a configuration in which the pole piece and the permanent magnet are assembled in a state of being guided in the radial direction by a jig or the like in a separate process. This is because the cost of the assembly process, the cost of equipment, and the like are reduced.

Figure 13:
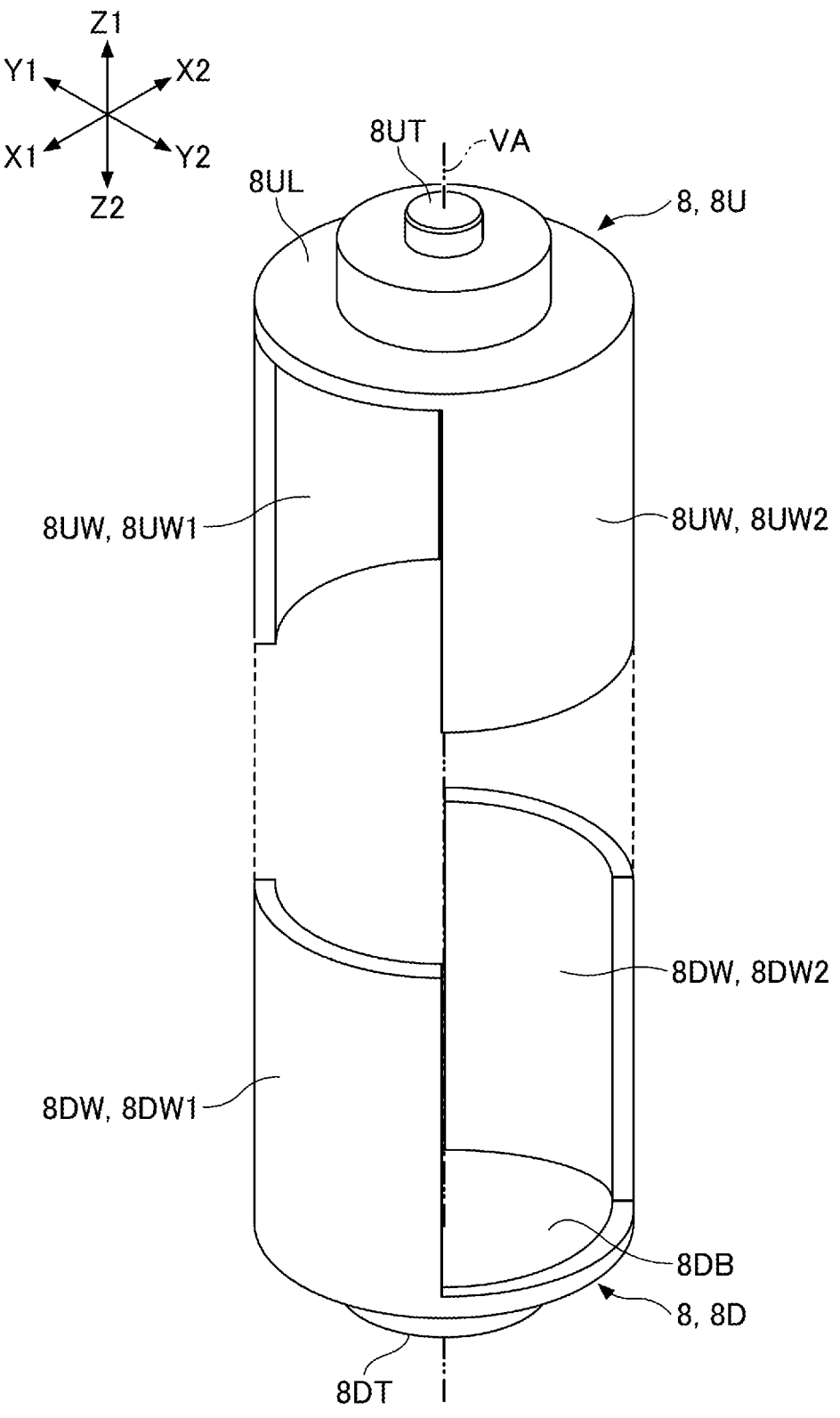
FIG. 13 is a perspective view of another configuration example of a movable case constituting the vibration generating device.

Next, another configuration example of the movable case 8 will be described with reference to FIG. 13. FIG. 13 is a perspective view of another configuration example of the movable case 8.

The movable case 8 illustrated in FIG. 13 is different from the movable case 8 illustrated in FIG. 3 in that the first movable case member 8U includes an upper partial cylinder 8UW and the second movable case member 8D includes a lower partial cylinder 8DW instead of the tube 8DC, but is the same as the movable case 8 illustrated in FIG. 3 in other respects.

Specifically, in the movable case 8 illustrated in FIG. 13, the first movable case member 8U includes the cover 8UL, the protrusion 8UT provided at the upper end of the cover 8UL, and the upper partial cylinder 8UW extending downward from the outer edge of the cover 8UL. The upper partial cylinder 8UW has two outer peripheral portions (a first upper partial cylinder 8UW1 and a second upper partial cylinder 8UW2), each of which have a partial annular shape as the cross section in a virtual plane parallel to the XY plane. The first upper partial cylinder 8UW1 and the second upper partial cylinder 8UW2 are configured such that the central angle of each outer circumferential surface is 90°, and are disposed so as to face each other with the vibration axis VA being interposed between the first upper partial cylinder 8UW1 and the second upper partial cylinder 8UW2. The second movable case member 8D includes the bottom 8DB, the protrusion 8DT provided at the lower end of the bottom 8DB, and the lower partial cylinder 8DW extending upward from the outer edge of the bottom 8DB. The lower partial cylinder 8DW has two outer peripheral portions (a first lower partial cylinder 8DW1 and a second lower partial cylinder 8DW2), each of which have a partial annular shape as the cross section in a virtual plane parallel to the XY plane. The first lower partial cylinder 8DW1 and the second lower partial cylinder 8DW2 are configured such that the central angle of each outer circumferential surface is 90°, and are disposed to face each other with the vibration axis VA being interposed between the first lower partial cylinder 8DW1 and the second lower partial cylinder 8DW2. In the illustrated example, the upper partial cylinder 8UW and the lower partial cylinder 8DW are formed so as to constitute a complete cylinder when the first movable case member 8U and the second movable case member 8D are combined. However, the upper partial cylinder 8UW and the lower partial cylinder 8DW may be configured such that a clearance is formed between the upper partial cylinder 8UW and the lower partial cylinder 8DW when the first movable case member 8U and the second movable case member 8D are combined. That is, at least one of the first upper partial cylinder 8UW1, the second upper partial cylinder 8UW2, the first lower partial cylinder 8DW1, and the second lower partial cylinder 8DW2 may be configured such that the central angle of the outer circumferential surface is less than 90°. This is because, in the process of heating the entire vibration generating device 101 after assembly, heat can be efficiently supplied to the thermosetting adhesive applied to the members inside the movable case 8, that is, the thermosetting adhesive can be efficiently cured.

Additionally, each of the upper partial cylinder 8UW and the lower partial cylinder 8DW may be configured to have one or three or more outer peripheral portions. Additionally, in the illustrated example, the upper partial cylinder 8UW and the lower partial cylinder 8DW are formed to have the same shape. That is, the upper partial cylinder 8UW and the lower partial cylinder 8DW are the same components. However, the upper partial cylinder 8UW and the lower partial cylinder 8DW may be separate components having different shapes.

As described above, the vibration generating device 101 according to the embodiment of the present disclosure may include the fixed case HS, the movable body MB disposed inside the fixed case HS, the support member 9 that supports the movable body MB such that the movable body MB can vibrate along the first direction (the axial direction of the vibration axis VA (the Z-axis direction)) with respect to the fixed case HS, and the coil 5 attached to the fixed case HS, as illustrated in FIG. 1. Here, as illustrated in FIG. 3, the movable body MB may include the magnetic field generator MT that generates a magnetic field along the second direction (the radial direction of the circle centered on the vibration axis VA) perpendicular to the first direction, and the movable case 8 that accommodates the magnetic field generator MT. Additionally, the magnetic field generator MT may be configured by multiple magnetic members (the permanent magnet 6 and the pole piece 7) including the permanent magnet 6. Additionally, the multiple magnetic members (the permanent magnet 6 and the pole piece 7) may be accommodated in the movable case 8 such that the multiple magnetic members are stacked in the first direction and are not movable relative to each other. The movable case 8 may be configured by multiple movable case members (the first movable case member 8U and the second movable case member 8D) that can be separated in the first direction. Here, each of the multiple magnetic members preferably has an outer shape (the cylindrical shape in the illustrated example) that matches the inner shape (the cylindrical shape in the illustrated example) of the movable case 8. This is because the multiple magnetic members are prevented from moving in the radial direction when the multiple magnetic members are accommodated in the movable case 8.

This configuration provides an effect that the vibration generating device 101 that is easy to assemble at low cost can be provided. This is because, in this configuration, the magnetic field generator MT including multiple magnetic members can be assembled without using a jig.

Additionally, as illustrated in FIG. 3, in the vibration generating device 101, one of the multiple magnetic members may be the solid permanent magnet 6 having a cylinder shape or a disc shape. The movable case 8 may include the first movable case member 8U and the second movable case member 8D. In this case, the second movable case member 8D may include the bottom 8DB, the tube 8DC extending along the first direction from the outer edge of the bottom 8DB, and the opening edge 8DK formed at the end of the tube 8DC. Additionally, the first movable case member 8U may include the cover 8UL attached to the opening edge 8DK of the second movable case member 8D. Here, the permanent magnet 6 may be a cylindrical or annular permanent magnet.

This configuration provides an effect that the vibration generating device 101 that is easy to assemble at a lower cost can be provided. This is because the magnetic field generator MT can be assembled simply by fitting the multiple magnetic members into the tube 8DC of the second movable case member 8D without using a jig. Additionally, this configuration also provides an effect that the component cost can be further reduced by reducing the thickness of the permanent magnet 6. This is because the permanent magnet 6 is fit into the second movable case member 8D so as not to be movable relative to the second movable case member 8D, and therefore the permanent magnet 6 can be prevented from being damaged when the movable body MB is assembled or when the vibration generating device 101 is used.

Additionally, as illustrated in FIG. 4, the permanent magnet 6 may be accommodated in the movable case 8 such that the movement of the permanent magnet 6 in the second direction inside the movable case 8 is restricted by the inner wall of the tube 8DC, and the movement of the permanent magnet 6 in the first direction inside the movable case 8 is restricted by the bottom 8DB and the cover 8UL.

This configuration provides an effect that the vibration generating device 101 that is easy to assemble at a lower cost can be provided. This is because the movable body MB can be assembled simply by fitting the multiple magnetic members and the first movable case member 8U into the tube 8DC of the second movable case member 8D without using a jig.

Additionally, the multiple magnetic members constituting the magnetic field generator MT may include the pole pieces 7, as illustrated in FIG. 3. In the illustrated example, the pole pieces 7 include the first pole piece 7U disposed on the upper side of the permanent magnet 6 and the second pole piece 7D disposed on the lower side of the permanent magnet 6, but the first pole piece 7U may be omitted if the weight of the movable body MB can be configured to a desired weight.

This configuration provides an effect that the vibration generating device 101 that is easy to assemble at a lower cost can be provided. This is because the magnetic field generator MT can be assembled simply by fitting the permanent magnet 6 and the pole pieces 7 into the tube 8DC of the second movable case member 8D without using a jig.

Additionally, as illustrated in FIG. 4, the pole piece 7 may be accommodated in the movable case 8 such that the movement of the pole piece 7 in the second direction inside the movable case 8 is restricted by the inner wall of the tube 8DC, and the movement of the pole piece 7 in the first direction inside the movable case 8 is restricted by the bottom 8DB and the cover 8UL.

This configuration provides an effect that the component cost can be further reduced by further reducing the thickness of the permanent magnet 6. This is because the permanent magnet 6 and the pole pieces 7 are fit into the second movable case member 8D such that the permanent magnet 6 and the pole pieces 7 are stacked and are not movable relative to each other, and therefore the permanent magnet 6 can be prevented from being damaged when the movable body MB is assembled or when the vibration generating device 101 is used.

Additionally, the movable case 8 may be formed of a nonmagnetic material through which the magnetic field generated by the magnetic field generator MT can pass. For example, the movable case 8 may be die-cast zinc or die-cast zinc alloy. However, the movable case 8 may be formed of a material other than metal, such as synthetic resin, as long as the weight of the movable body MB can be configured to a desired weight.

This configuration provides an effect that the magnetic field generated by the magnetic field generator MT can be prevented from being adversely affected by the movable case 8. For example, this configuration provides an effect that the magnetic field generated by the magnetic field generator MT can be prevented from being attenuated or blocked by the movable case 8. Additionally, the configuration in which the movable case 8 is formed by die-cast zinc or die-cast zinc alloy provides an effect that molding is facilitated or the weight is easily increased.

Additionally, as illustrated in FIG. 4, the cover 8UL may be configured such that the outer diameter D4 of the cover 8UL is less than the inner diameter D5 of the opening edge 8DK, desirably, the outer diameter D4 of the cover 8UL is substantially equal to the inner diameter D5 of the opening edge 8DK, and may be configured such that the cover 8UL is fixed to the inner side of the opening edge 8DK by an adhesive.

This configuration provides an effect that the movable body MB including the magnetic field generator MT can be assembled more easily. This is because the movable body MB including the magnetic field generator MT can be assembled simply by fitting the permanent magnet 6, the pole piece 7, and the first movable case member 8U into the tube 8DC of the second movable case member 8D and joining them with an adhesive without using a jig.

Additionally, as illustrated in FIG. 1, the support member 9 may include the first plate spring member 9U and the second plate spring member 9D. An outer end portion of the first plate spring member 9U (the first outer end portion 9EU) is fixed to the fixed case HS, an inner end portion of the first plate spring member 9U (the first inner end portion 9IU) is fixed to the first movable case member 8U, an outer end portion of the second plate spring member 9D (the second outer end portion 9ED) is fixed to the fixed case HS, and an inner end portion of the second plate spring member 9D (the second inner end portion 9ID) is fixed to the second movable case member 8D.

This configuration provides an effect that the assembly of the vibration generating device 101 can be facilitated. This is because the support member 9 can be assembled to the fixed case HS simply by fitting the second plate spring member 9D into the fixed case HS (the second fixed case member 2) without using a jig and fitting the first plate spring member 9U into the fixed case HS (the first fixed case member 1) without using a jig.

Additionally, the method of manufacturing the vibration generating device 101 according to the embodiment of the present disclosure may include a step of installing one movable case member (the second movable case member 8D) among the multiple movable case members (the first movable case member 8U and the second movable case member 8D) inside the fixed case HS (see the lower drawing of FIG. 9), a step of subsequently assembling the magnetic field generator MT to the one movable case member (the second movable case member 8D) among the multiple movable case members (see the upper drawings of FIG. 10 and FIG. 11), and a step of subsequently installing the remaining movable case member (the first movable case member 8U) among the multiple movable case members inside the fixed case HS (see the lower drawing of FIG. 11).

This manufacturing method provides an effect that the vibration generating device 101 that is easy to assemble at low cost can be provided. This is because, in this manufacturing method, the first movable case member 8U, the second movable case member 8D, and the movable body MB including the magnetic field generator MT can be assembled without using a jig.

Additionally, the method of manufacturing the vibration generating device 101 according to the embodiment of the present disclosure may include a step of installing the second movable case member 8D inside the fixed case HS (see the lower drawing of FIG. 9), a step of subsequently installing the permanent magnet 6 inside the second movable case member 8D (see the lower drawing of FIG. 10), and a step of subsequently attaching the first movable case member 8U to the opening edge 8DK of the second movable case member 8D (see the lower drawing of FIG. 11).

This manufacturing method provides an effect that the vibration generating device 101 that is easy to assemble at a lower cost can be provided. This is because, in this manufacturing method, the permanent magnet 6 can be included in the movable body MB simply by fitting the permanent magnet 6 into the second movable case member 8D without using a jig.

Additionally, the vibration generating device 101 according to the embodiment of the present disclosure may include, as illustrated in FIG. 1, the fixed case HS having a tube CP extending in the first direction (the axial direction of the vibration axis VA), the coil 5 attached inside the tube CP, the movable body MB arranged inside the coil 5, the magnetic field generator MT (see FIG. 3) that forms the movable body MB and generates the magnetic field toward the coil 5, and the support member 9 that is interposed between the fixed case HS and the movable body MB and supports the movable body MB inside the coil 5 (on a side closer to the vibration axis VA) such that the movable body MB can vibrate in the first direction. Here, the fixed case HS may include the first fixed case member 1 having the first outer cylinder 1A and the inner cylinder 1N (see FIG. 2) having a diameter smaller than that of the first outer cylinder 1A and extending from the first outer cylinder 1A along the first direction, and the second fixed case member 2 having the second outer cylinder 2A attached to the end of the first outer cylinder 1A so as to cover the inner cylinder 1N. As illustrated in FIG. 4, the coil 5 may be wound around the inner cylinder 1N and covered with the second outer cylinder 2A.

This configuration includes the first fixed case member 1 having the inner cylinder 1N functioning as a coil bobbin, and therefore, in comparison with a configuration including a coil bobbin and a fixed case as separate components, the configuration provides an effect that a problem such as power loss or noise can be prevented. This is because, in this configuration, a problem such as power loss or noise due to a rattling movement between the coil bobbin and the fixed case do not occur. Here, the power loss indicates that, for example, the driving force generated by the driver DM is lost without being used for the movement (the vibration) of the movable body MB. Additionally, this configuration includes the second fixed case member 2 having the second outer cylinder 2A functioning as a coil cover, and therefore, in comparison with a configuration including a coil cover and a fixed case as separate components, the configuration provides an effect that an increase in the number of components can be suppressed. Additionally, this configuration provides an effect that the coil 5 can be protected and damage to the coil 5 can be suppressed because the coil 5 is covered by the second outer cylinder 2A that functions as a coil cover.

Here, the support member 9 may be a plate spring member attached to the end of the movable body MB in the first direction. In this case, the plate spring member may be supported by the step ST provided inside the fixed case HS. Additionally, the plate spring member may be joined to the step ST by an adhesive. Additionally, the movable body MB may be joined to the plate spring member by an adhesive.

In the illustrated example, the support member 9 includes the first plate spring member 9U and the second plate spring member 9D. The first plate spring member 9U is supported by the step ST (the upper step 1S) provided inside the first fixed case member 1, and the second plate spring member 9D is supported by the step ST (the lower step 2S) provided inside the second fixed case member 2. However, the second plate spring member 9D may be supported by another step provided inside the first fixed case member 1. For example, the second plate spring member 9D may be supported by a step provided inside the inner cylinder 1N of the first fixed case member 1.

This configuration provides an effect that the diameter of the support member 9 can be increased. This is because the outer end of the support member 9 is attached to the fixed case HS positioned on the outermost side (the side far from the vibration axis VA) of the vibration generating device 101. Additionally, this configuration provides an effect that the vibration generating device 101 that is easy to assemble at low cost can be provided. This is because, in this manufacturing method, the support member 9 can be attached to the fixed case HS simply by placing a part of the plate spring member serving as the support member 9 on the step ST provided inside the fixed case HS and joining them with an adhesive without using a jig. Specifically, this is because, in this manufacturing method, the second plate spring member 9D can be attached to the second fixed case member 2 simply by placing the second outer end portion 9ED of the second plate spring member 9D on the step ST (the lower step 2S) of the second fixed case member 2 and joining them with an adhesive without using a jib. Additionally, this is because, in this manufacturing method, the movable body MB can be attached to the support member 9 simply by placing the movable body MB on a part of the plate spring member serving as the support member 9 and joining them with an adhesive without using a jig. Specifically, this is because, in this manufacturing method, the movable body MB can be attached to the second plate spring member 9D simply by placing the movable body MB on the second inner end portion 9ID of the second plate spring member 9D and joining them with an adhesive without using a jig. Additionally, in this manufacturing method, the first plate spring member 9U can be attached to the movable body MB simply by placing the first inner end portion 9IU of the first plate spring member 9U on the movable body MB and joining them with an adhesive without using a jig, and the first plate spring member 9U can be attached to the first fixed case member 1 simply by placing the first outer end portion 9EU of the first plate spring member 9U on the step ST (the upper step 1S) of the first fixed case member 1 and joining them with an adhesive without using a jig.

Additionally, as illustrated in FIG. 3, the wiring substrate 4 may be attached to the first fixed case member 1 from the distal surface 1AP1 to the proximal surface 1AP2 forming a step in the first direction on the outer circumferential surface (the flat surface 1AP) of the first outer cylinder 1A. The wiring substrate 4 may include the first conductive pattern PD1 in which the end of the coil 5 is connected to a position on the proximal surface 1AP2 covered by the protrusion 2P of the second outer cylinder 2A as illustrated in FIG. 4 when the first fixed case member 1 and the second fixed case member 2 are combined, and the second conductive pattern PD2 in which an external wiring is connected to a position on the distal surface 1AP1 not covered by the protrusion 2P of the second outer cylinder 2A.

This configuration provides an effect that electrical connection between the coil 5 and a device located outside the fixed case HS such as the controller CTR is facilitated.

Additionally, in the vibration generating device 101 according to the embodiment of the present disclosure, as illustrated in FIG. 3, the magnetic field generator MT may include the permanent magnet 6 having a magnetization direction in the first direction (the axial direction of the vibration axis VA), the first pole piece 7U disposed on one end side of the permanent magnet 6 in the first direction and generating a magnetic field extending in the second direction perpendicular to the first direction (the radial direction of the circle centered on the vibration axis VA), and the second pole piece 7D disposed on the other end side of the permanent magnet 6 in the first direction and generating a magnetic field extending in the second direction. As illustrated in FIG. 4, the coil 5 may be disposed, without being disposed on the outer side of one pole piece among the first pole piece 7U and the second pole piece 7D (the first pole piece 7D in the illustrated example), on the outer side of the other pole piece among the first pole piece 7U and the second pole piece 7D (the second pole piece 7U in the illustrated example) in the second direction. That is, the coil 5 may be disposed only on the outer side of one of the two pole pieces 7. Here, the "outer side" indicates a side far from the vibration axis VA. In the illustrated example, the vibration generating device 101 is configured such that the coil 5 is disposed only on the outer side of the second pole piece 7D, but may be configured such that the coil 5 is disposed only on the outer side of the first pole piece 7U. Additionally, the vibration generating device 101 may be configured to include a coil disposed on the outer side of the first pole piece 7U and a coil disposed on the outer side of the second pole piece 7D. Additionally, when the coil 5 is disposed only on the outer side of the second pole piece 7D, the first pole piece 7U may be omitted. Similarly, when the coil 5 is disposed only on the outer side of the first pole piece 7U, the second pole piece 7D may be omitted. The configuration including only one coil provides an effect that the assembly is facilitated in comparison with the configuration including two coils. This is because, in the configuration including two coils, the wire needs to be wound such that the winding direction of one coil and the winding direction of the other coil are opposite to each other.

Additionally, as illustrated in FIG. 3, the vibration generating device 101 according to the embodiment of the present disclosure may include the fixed body FB, the movable body MB, the support member 9 interposed between the fixed body FB and the movable body MB and supporting the movable body MB such that the movable body MB can vibrate in the first direction (the axial direction of the vibration axis VA) with respect to the fixed body FB, the permanent magnet 6 included in the movable body MB and having a magnetization direction in the first direction, the pole piece 7 attached to at least one end side of the permanent magnet 6 in the first direction and generating the magnetic field extending in the second direction perpendicular to the first direction, and the coil 5 attached to the fixed body FB to surround the pole piece 7. As illustrated in FIG. 5, the pole piece 7 (the second pole piece 7D) may be configured such that the size H1 in the first direction is greater than the size H2 of the coil 5 in the first direction.

This configuration provides an effect that the weight of the movable body MB can be increased in comparison with a case where the size of the pole piece 7 is less than the size of the coil 5 in the first direction. Additionally, as described with reference to FIG. 6, this configuration provides an effect that a change (a decrease) in the driving force caused by the movement of the movable body MB can be suppressed.

Additionally, as illustrated in FIG. 5, the coil 5 may have a shape in which the size W1 in the second direction is greater than the size H2 in the first direction. That is, the coil 5 may have a horizontally long cross section.

This configuration can achieve an effect that a change (a decrease) in the driving force caused by the movement of the movable body MB as described above can be suppressed by reducing the size of the coil 5 in the longitudinal direction (the vertical direction). Additionally, this configuration provides an effect that a decrease in the number of turns of the coil 5 due to the reduction in the size in the vertical direction can be offset by increasing the size in the lateral direction (the radial direction).

Additionally, as illustrated in FIG. 4, the pole pieces 7 may include the first pole piece 7U attached to one end side (the Z1 side) of the permanent magnet 6 in the first direction and the second pole piece 7D attached to the other end side (the Z2 sides) of the permanent magnet 6 in the first direction. The coil 5 may be disposed, without being disposed on the outer side of one pole piece (the first pole piece 7U in the illustrated example) among the first pole piece 7U and the second pole piece 7D in the second direction, on the outer side of the other pole piece (the second pole piece 7D in the illustrated example) among the first pole piece 7U and the second pole piece 7D.

This configuration provides an effect that the manufacturing process of the vibration generating device 101 can be prevented from being complicated. Additionally, this configuration provides an effect that a configuration of a manufacturing apparatus for manufacturing the vibration generating device 101 can be prevented from being complicated. This is because, in the configuration in which the separate coils are respectively disposed on the outer sides of the first pole piece 7U and the second pole piece 7D, it is necessary to reverse the winding direction in the middle when the wire is wound around the fixed body FB such that the winding directions of the respective coils are opposite to each other in the top view seen along the vibration axis VA. In other words, this is because, in the configuration in which the coil is disposed only on the outer side of one of the first pole piece 7U and the second pole piece 7D, it is not necessary to reverse the winding direction when the wire is wound around the fixed body FB. Here, reversing the winding direction in the middle causes an increase in the time required for the winding process and then, an increase in the winding process cost. Additionally, a reversing mechanism or the like is required to reverse the winding direction in the middle, which causes an increase in equipment cost. The configuration using only one coil can provide an effect that such increases in the winding process cost, the equipment cost, and the like can be avoided and the manufacturing cost can be reduced.

The preferred embodiments of the present disclosure have been described in detail above. However, the present invention is not limited to the above-described embodiments. Various modifications, substitutions, and the like can be applied to the above-described embodiments without departing from the scope of the present invention. Additionally, the features described with reference to the above-described embodiments may be appropriately combined as long as there is no technical contradiction.

What is claimed is:

1. A vibration generating device comprising:
   a fixed case including a tube extending in a first direction;
   a coil attached inside the tube;
   a movable body arranged inside the coil, the movable body including a magnetic field generator configured to generate a magnetic field toward the coil; and
   a support member interposed between the fixed case and the movable body and supporting the movable body inside the coil such that the movable body is configured to vibrate in the first direction,
   wherein the fixed case includes a first fixed case member including a first outer cylinder and an inner cylinder having an outer diameter less than an outer diameter of the first outer cylinder and extending from the first outer cylinder along the first direction, and a second fixed case member including a second outer cylinder attached to an end of the first outer cylinder to cover the inner cylinder, wherein the coil is wound around the inner cylinder and covered by the second outer cylinder, and wherein the movable body further includes a movable tubular case configured to fix the magnetic field generator to the support member, an outer diameter of the movable tubular case being less than an inner diameter of the inner cylinder.

2. The vibration generating device as claimed in claim 1, wherein the support member is a plate spring member attached to an end of the movable body in the first direction, and wherein the plate spring member is supported by a step provided inside the fixed case.

3. The vibration generating device as claimed in claim 2, wherein the plate spring member is fixed to the step by an adhesive.

4. The vibration generating device as claimed in claim 3, wherein the movable body is fixed to the plate spring member by an adhesive.

5. A vibration generating device, comprising:

a fixed case including a tube extending in a first direction;

a coil attached inside the tube;

a movable body arranged inside the coil, the movable body including a magnetic field generator configured to generate a magnetic field toward the coil; and a support member interposed between the fixed case and the movable body and supporting the movable body inside the coil such that the movable body is configured to vibrate in the first direction, wherein the fixed case includes a first fixed case member including a first outer cylinder and an inner cylinder having a diameter less than a diameter of the first outer cylinder and extending from the first outer cylinder along the first direction, and a second fixed case member including a second outer cylinder attached to an end of the first outer cylinder to cover the inner cylinder, wherein the coil is wound around the inner cylinder and covered by the second outer cylinder, wherein a wiring substrate is attached to the first fixed case member from a distal surface to a proximal surface forming a step in the first direction on an outer circumferential surface of the first outer cylinder, and wherein the wiring substrate includes:

a first conductor pattern to which an end portion of the coil is connected, at a position on the proximal surface covered by the second outer cylinder, and a second conductive pattern to which an external wiring is connected, at a position on the distal surface that is not covered by the second outer cylinder.

6. A vibration generating device comprising:

a fixed case including a tube extending in a first direction;

a coil attached inside the tube;

a movable body arranged inside the coil, the movable body including a magnetic field generator configured to generate a magnetic field toward the coil; and a support member interposed between the fixed case and the movable body and supporting the movable body inside the coil such that the movable body is configured to vibrate in the first direction, wherein the fixed case includes a first fixed case member including a first outer cylinder and an inner cylinder having a diameter less than a diameter of the first outer cylinder and extending from the first outer cylinder along the first direction, and a second fixed case member including a second outer cylinder attached to an end of the first outer cylinder to cover the inner cylinder, wherein the coil is wound around the inner cylinder and covered by the second outer cylinder, wherein the magnetic field generator includes a permanent magnet having a magnetization direction in the first direction, a first pole piece disposed on one end side of the permanent magnet in the first direction and configured to generate a magnetic field extending in a second direction perpendicular to the first direction, and a second pole piece disposed on another end side of the permanent magnet in the first direction and configured to generate a magnetic field extending in the second direction, and wherein the coil is not disposed to face an outer side of one pole piece among the first pole piece and the second pole piece in the second direction, and is disposed to face an outer side of another pole piece among the first pole piece and the second pole piece in the second direction.

* * * * *